US006457040B1

(12) United States Patent
Mizuhara et al.

(10) Patent No.: US 6,457,040 B1
(45) Date of Patent: *Sep. 24, 2002

(54) METHOD AND SYSTEM FOR A DISTRIBUTED NETWORK COMPUTING SYSTEM FOR PROVIDING APPLICATION SERVICES

(75) Inventors: Toru Mizuhara; Toshiyuki Yamagami; Hiroshi Ueda, all of Tokyo; Masaki Utsumi, Saitama-ken, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,965

(22) Filed: Jan. 15, 1999

(51) Int. Cl.[7] .............................. G06F 15/16
(52) U.S. Cl. ..................... 709/201; 709/203; 709/217; 709/227; 709/229; 713/201
(58) Field of Search ............................. 709/201–203, 709/206–207, 216–219, 227–229, 238–240, 249–250, 223–224; 370/400–401; 455/412, 418–420, 445, 461, 464; 379/201–204, 219; 713/200–201, 182–183

(56) References Cited

U.S. PATENT DOCUMENTS

| 5,522,041 | A | * | 5/1996 | Murakami et al. | 709/203 |
|---|---|---|---|---|---|
| 5,647,002 | A | * | 7/1997 | Brunson | 709/206 |
| 5,666,487 | A | * | 9/1997 | Goodman et al. | 709/246 |
| 5,740,231 | A | * | 4/1998 | Cohn et al. | 709/206 |
| 5,742,905 | A | * | 4/1998 | Pepe et al. | 455/461 |
| 5,815,665 | A | * | 9/1998 | Teper et al. | 709/229 |
| 5,826,023 | A | * | 10/1998 | Hall et al. | 709/206 |
| 5,889,942 | A | * | 3/1999 | Orenshteyn | 709/203 |
| 6,067,477 | A | * | 5/2000 | Wewalaarachchi et al. | 709/223 |
| 6,070,190 | A | * | 5/2000 | Reps et al. | 709/224 |
| 6,088,451 | A | * | 7/2000 | He et al. | 709/227 |
| 6,138,156 | A | * | 10/2000 | Fletcher et al. | 709/224 |
| 6,189,104 | B1 | * | 2/2001 | Leppek | 713/201 |
| 6,195,677 | B1 | * | 2/2001 | Utsumi | 709/201 |
| 6,195,678 | B1 | * | 2/2001 | Komuro | 709/202 |
| 6,275,941 | B1 | * | 8/2001 | Saito et al. | 713/201 |

* cited by examiner

*Primary Examiner*—Bharat Barot
(74) *Attorney, Agent, or Firm*—Finnegan, Henderson, Farabow, Garrett & Dunner, L.L.P.

(57) ABSTRACT

The server computer 155 is provided with an access section 151, a security section 152, a application function conversion section 153, application service supply section 154 and a remote agent 155 therein. The data terminals 13 is provided with a local agent 131, client software 132, key management client 133, enciphering section 134 therein. In this way, the server computer 15 and the data terminals 13 connected through a network 14 can realize a countermeasure for the circuit breakdown and an improvement of the security function regarding the data cache function and vicarious login.

25 Claims, 24 Drawing Sheets

TABLE 1 : MANAGEMENT ITEMS OF PERSONAL DATA

| NAME OF ACCOUNT OF THE SYSTEM | CONSTRUCTION OF DATA | COMPETENCE | ATTRIBUTE ITEMS | ATTRIBUTE VALUE |
|---|---|---|---|---|
| ACCOUNT 1 | DATA CONSTRUCTION 1 | COMPETENCE 1 | ITEM 1-1 | VALUE 1-1 |
|  |  |  | ITEM 1-2 | VALUE 1-2 |
| ACCOUNT 2 | DATA CONSTRUCTION 2 | COMPETENCE 2 | ITEM 2-1 | VALUE 2-1 |
| ... | ... | ... | ... | ... |

Fig.23

TABLE 2: RELATION BETWEEN THE NAME OF ACCOUNT AND DISCRIMINATOR

| NAME OF ACCOUNT OF THE SYSTEM | DISCRIMINATOR |
|---|---|
| ACCOUNT 1 | DISCRIMINATOR 1 |
| ACCOUNT 1 | DISCRIMINATOR 2 |
| ACCOUNT 2 | DISCRIMINATOR 3 |
| ... | ... |

Fig.24

METHOD AND SYSTEM FOR A DISTRIBUTED NETWORK COMPUTING SYSTEM FOR PROVIDING APPLICATION SERVICES

BACKGROUND OF THE INVENTION

The present invention relates to a distributed network computing system, more particularly to a distributed network computing system, wherein a plurality of different kinds of communication networks such as a public communication network, wired LAN (Local Area Network), wireless LAN, etc. are involved together, and wherein application services of various kinds of application software are supplied to the various kinds of terminals connected to these networks such as personal computers(PC), portable PC, which are different in processing capacities, to data exchange apparatus used for the system and to the data exchange method used for the system and the memory media, in which the method is stored and which can be read out by a computer.

In the conventional data processing by a computer, a concentrated processing system, wherein a plurality of terminal equipment are connected to a main computer, has been the mainstream. In the meantime, in the case of a distributed network computing system, a plurality of computers are connected with each other by a network and resources that the respective computers own, are commonly used, and the effective processing can be performed. An environment, wherein the application software are processed by different types of the computers, is called as a distributed computing environment.

In the network, wherein the distributed computing is realized, it is not necessary for the users to know, where are programs and data. As the network functions theoretically, as if the whole network is a computer, the users can utilize the necessary data and functions in their operating situation.

As portable data terminals, such as a personal digital cellular and a personal handyphone system) become popular, the mobile computing has become realistic. For example, it has been made possible, easily to call up the mail outside of the company, and to refer to the information of WWW (World Wide Web) by a combination of PHS and Notebook Personal computer. However, in the mobile environment, there has been a limitation that the same maneuverability as in the office cannot be expected out of the office.

Such limitations are that the communication is interrupted during the communication, or that the display screen of the mobile terminals are uncomfortable to see because of its small size. Under the mobile computing environment, a part of the work, which can be executed only in the office, can be executed out of the office, time can be saved and a quick transaction can be realized. As an application for the mobile computing at its early stage, checking of the electronic mail and confirmation of notice board can be considered. Furthermore, a work that can be executed in the office upon return to the office in order to refer the data available only in the office, can be executed at the office of the customer. As explained in the above, not only the works can be executed out of the office as if works are executed in the office, but also the form of the works which could not be realized in the past environment, can be realized.

Now then, as for the form of the system in case of the mobile computing, several models can be considered depending upon the main portion of the communication. In this case, a model, in which the client takes the initiative and the server computer in the office is utilized by a mobile terminal, is assumed. Besides this form, a form, in which the server computer controls its terminals depending the information from the mobile terminal, as well as a form in which the server computer is used as a hub station that connect the mobile terminals each other, can be considered.

On the other hand, there are many restrictions for accessing to the data in the office, as the mobile communication is used. At the present time, problems such as circuit speed, circuit quality, circuit troubles and communication rates can be considered.

Though a conversion of the attribute data, which are subjected to a control in a network control system, as shown in Laying-Open Hei8-16500, and a conversion of the application program for telephone and data communication as shown in U.S. Pat. No. 5,572,675, can be considered, these prior arts disclose nothing to solve the problems, which arise in the form of the system for mobile computing.

Furthermore under the environment of network computing such as mobile computing as described in the above, for example, when the circuit which was connecting the terminal and the server computer, was broken by any reason, the work that had been done between the terminal and the server computer before the breakdown became insignificant, and it was necessary to repeat the same work. Also, under the net work computing environment such as the mobile computing described in the above, when a data processing job, which required a long time, was instructed from a terminal to the server computer, the terminal had to wait with the circuit being connected, until the processing of the aforementioned job was finished by the server computer. So that, the communication rate became high. Besides, during the processing is executed, any other work could not be done on the side of the terminal, which was very inconvenient. Furthermore, the security was not perfect. Further problem is that, the user of the terminal was compelled to login (logon) every time, when the user tried to access to a desired server computer or an application software, which maneuverability was inferior and efficiency was not perfect. Furthermore, There were also cases in the prior art that it was very hard to login (logon) depending upon the type of the terminal used. There were also cases that it was impossible to access to or to login (logon) a desired server computer or an application software depending upon the type of the terminal.

BRIEF SUMMARY OF THE INVENTION

Therefore, the object of the present invention is to dissolve the aforementioned problems, and to have application services provided in accordance with the processing capacity of the respective terminal equipment in an environment of the network, wherein various kinds of terminals are existing. Another object of the present invention is, to provide a distributed network computing system, a data exchange apparatus used for the said system, a data exchange method used for the said system and the memory media in which the said method is stored and which can be readout by a computer, which can provide an application service in accordance with the communication capacities of the said infrastructures, even if a plurality of communication infrastructures coexisteds in the environment. In other words, the object of the present invention is to dissolve the aforementioned problems and to have a work in the office continuously executed even in the environment of the mobile computing system.

The another object of the present invention is to have a countermeasure properly taken, even when the communication is broken down during the communication, and further to have the terminal equipment effectively utilized even at the processing data which require a long time, and to provide a economically excellent system and to attain a high security function and to improve the login (logon) function.

In order to attain the said objects, the present invention is conceived as follows:

(1) A distributed network computing system is provided which comprises an data processing apparatus, which supplies an application service such as various application software, various kinds of terminals, which receive the application service from the said data processing apparatus, and a communication network, which connects said data processing apparatus and said terminals, wherein said data processing apparatus is provided with a data exchange device, and said data exchange device further comprises an access control means which controls the connection from the said terminals, a security control means which judges the certification of said terminals with regard to said access means and a function converting means, which converts the contents of the application service to be supplied to said terminals based upon the data from said security control means to the format suitable for said terminals.

According to another embodiment of, the present invention, a distributed network computing system comprising a data processing apparatus, which supplies an application service such as various application software, various kinds of terminals, which receive the application service from said data processing apparatus, and a communication network, which connects said data processing apparatus and said terminals is provided, wherein a network connecting means which connects the networks with each other and a data exchange apparatus, which is provided in said network connecting means, are provided, and said data processing apparatus is provided with a data exchange apparatus, and data exchange apparatus further comprises an access control means which controls the connection from the said terminals, a security control means which judges the certification of the said terminal with regard to the said access means and a function converting means, which converts the contents of the application service to be supplied to said terminal based upon the data from the said security control means to the format suitable for said terminal.

Also, according to the present invention, said access control means is characterized in that the control is executed so as to perform the processing by means of proper connection control system or a manual control system at said terminals.

Furthermore, according to the present invention, said security control means is characterized in that enciphering is performed by means of a proper system at said terminal, when an application service is to be supplied.

Furthermore, according to the present invention, said security means is characterized in that by means of a proper system coding is performed at the same terminal, when the application service is supplied.

Furthermore, according to the present invention, said security control means is characterized in that said security control means, said access control means and said function converting means have a unified view regarding the accessing data terminal by issuing a new discriminator.

Furthermore, according to the present invention, said function converting means is characterized in that said function converting means is provided with a control means for data concerning said terminal and a means that controls the data regarding the interface with the application service and realizes a communication with the application service.

Furthermore, according to the present invention, said function converting means is characterized in that the data is converted into the form suitable to said terminal based upon the communication system used by the said terminal.

According to the present invention, the work in the office can be performed continuously even in a mobile computing environment. In other words, a supply of an application service can be realized, depending upon the processing capacity of the respective terminals and a supply of an application service can be realized depending the communication capacity of the said infrastructure, even if a plurality of communication infrastructures coexisted.

(2) A distributed network computing system is provided which comprises a data processing apparatus, which supplies an application service such as various application software, various kinds of terminals, which receive the application service from said data processing apparatus, and a communication network, which connects the said data processing apparatus and the said terminals, wherein said data processing apparatus is provided with a data exchange device, and said data exchange apparatus further comprises an access control means which controls the connection from said terminals, a security control means which judges the certification of said terminals with regard to the said access means and a function converting means, which converts the content of the said application service to be supplied to said terminals basing upon the data from said security control means to the format suitable for said terminals, a connection control means, which controls the connection condition with said terminals so as to provide the service content converted by means of said function converting means depending upon the connection condition.

According to another embodiment of the present invention a distributed network computing system is provided which comprises a data processing apparatus, which supplies an application service such as various application software, various kinds of terminals, which receive the application service from the said data processing apparatus, a communication network, which connects the said data processing apparatus and said terminals, a network connecting means which connects the networks with each other and a data exchange apparatus, which is provided in said network connecting means, wherein said data exchange apparatus further comprises an access control means, which controls the connection process from the terminals, a security control means which judges the certification of said terminals with regard to the said access means, a function converting means, which converts said service content of the application service to be supplied to said terminal to the format suitable for said terminal equipment based upon the data from the said security control means, and a connection control means which controls the connection condition with said terminals and provides the content of the service converted by means of the said function converting means based upon the said connection condition.

Also, according to the present invention, said access control means is characterized in that the control is executed so as to perform the processing by means of proper connection control system or a manual control system at the said terminals.

Furthermore, according to the present invention, said security control means is characterized in that enciphering is performed by means of a proper system at said terminal, when an application service is to be supplied.

Furthermore, according to the present invention, said security control means is characterized in that said security control means, said access control means and said function converting means have a unified view regarding the access to said data terminals by issuing a new discriminator.

Furthermore, according to the present invention, said function converting means is characterized in that said function converting means is provided with a control means of data concerning said terminal and a means that controls the data regarding the interface with the application service and realizes a communication with application service.

Furthermore, according to the present invention, said function converting means is characterized in that the data is converted into the form suitable to said terminal based upon the communication system used by the said terminal.

Furthermore, according to the present invention, said connection control means is characterized in that the interrupted data can be transmitted successively from the interrupted position by the breakdown based upon the record of data conversion record and the record of the connection to said terminal.

According to the present invention, the work in the office can be performed continuously even in a mobile computing environment. In other words, a supply of an application service can be realized depending upon the processing capacity of the respective terminals, and a supply of an application service can be realized depending the communication capacity of the said infrastructure, even if a plurality of communication infrastructures are coexisted.

Furthermore, according to the present invention, a proper countermeasure can be taken, even if in the case of breakdown when the communication is interrupted. In addition, in case of a data processing work which requires a long time, the terminal can be utilized effectively.

(3) A distributed network computing system is provided which comprises a data processing apparatus, which supplies an application service such as various application software, various kinds of terminals, which receive the application service from said data processing apparatus, and a communication network, which connects said data processing apparatus and said terminals. The system is characterized in that said data processing apparatus is provided with a data exchange device, and that said data exchange apparatus further comprises an access control means which controls the connection from said terminals, a security control means which judges the certification of said terminals with regard to said access means and a function converting means, which converts the contents of the said application service to be supplied to said terminals based upon the data from said security control means to the format suitable for the said terminals, a connection control means, which controls the connection condition so as to provide the service contents converted by means of said function converting means depending upon the connection condition, and a control means, through which said terminal is enabled to readout the specific data, when said terminal is in connection through the said network and also said terminal satisfies the specified conditions to request an access to the specified data.

According to another embodiment of the present invention, a distributed network computing system is provided which comprises a data processing apparatus, which supplies an application service such as various application software, various kinds of terminals, which receive the application service from said data processing apparatus, and a communication network, which connects said data processing apparatus with said terminals, and a data exchange apparatus, which is provided in said data processing apparatus, wherein said data exchange apparatus further comprises an access control means, which controls the connection process from the terminals, a security control means which judges the certification of said terminals with regard to said access control means, a function converting means, which converts said service contents of the application service to be supplied to the said terminal to the format suitable for the said terminals based upon the data from the said security control means, and a connection control means which controls the connection condition with said terminals and provides the contents of the service converted by means of the said function converting means based upon said connection condition, and a control means, through which said terminal is enabled to readout the specific data, when said terminal is in connection through said network and also said terminal satisfies the specified conditions to request an access to the specified data.

According to the present invention, said access control means is characterized in that the control is executed so as to perform the processing by means of a proper connection control system or a manual control system at the said terminals.

According to the present invention, said security control means is characterized in that enciphering is performed by means of a proper system at said terminal, when an application service is to be supplied.

According to the present invention, said security control means is characterized in that said security control means, said access control means and said function converting means have a unified view to the terminals accessing to the network, by issuing a new identifier.

According to the present invention, said function converting means is characterized in that said function converting means is provided with a means that controls the information regarding said terminals and a means which controls the information regarding the interface with the application service and realizes the communication with the application service.

According to the present invention, said function converting means is characterized in that the data is converted into the form suitable to said terminal based upon the communication system used by the said terminal.

According to the present invention, said connection control means is characterized in that the interrupted data can be transmitted successively from the interrupted position at the breakdown based upon the record of data conversion record and the record of connection condition to the said terminal.

According to the present invention, said data exchange apparatus and at least one of the said terminal are provided with a remote agent function, and said data exchange apparatus is characterized in that said data exchange apparatus and said terminal are enabled to execute a data cache function.

According to the present invention, the work in the office can be performed continuously even in a mobile computing environment. In other words, a supply of an application service can be realized, depending upon the processing capacity of the respective terminals, and a supply of an application service can be realized depending the communication capacity of the said infrastructure, even if a plurality of communication infrastructures are coexisted.

Furthermore, according to the present invention, a proper countermeasure can be taken even if in the case of breakdown when the communication is interrupted. In addition, in case of a data processing work which requires a long time, the terminal can be utilized effectively and is economically excellent, and the security function can be improved.

(4) A distributed network computing system is provided which comprises a data processing apparatus, which supplies an application service such as various application software, various kinds of terminals, which receive the application service from said data processing apparatus, and a communication network, which connects said data processing apparatus and said terminals. The system is characterized in that said data processing apparatus is provided with a data exchange device, and that said data exchange apparatus further comprises an access control means which controls connection from said terminals, a security control means which judges the certification of said terminals with regard to said access means and a function converting means, which converts the contents of the said application service to be supplied to said terminals based upon the data from said security control means to the format suitable for the said terminals, a connection control means, which controls the connection condition so as to provide the service content converted by means of said function converting means depending upon the connection condition, a control means, through which said terminal is enabled to readout the specific data, when said terminal is in connection through the said network and also said terminal satisfies the specified conditions to request an access to the specified data, and a control means which executes a certification processing by means of a proper system and controls the login (logon) processing in accordance with the terminals by means of a proper method depending upon the result of the certification process.

Furthermore, according to the present invention a distributed network computing system is provided which comprises a data processing apparatus, which supplies an application service such as various application software, various kinds of terminals, which receive the application service from the said data processing apparatus, and a communication network, which connects said data processing apparatus with said terminals, and a data exchange apparatus, which is provided in the said network connecting means, wherein said data processing apparatus further comprises an access control means, which controls the connection process from the terminals, a security control means which judges the certification of said terminals with regard to the access control means, a function converting means, which converts said service contents of the application service to be supplied to the said terminal to the format suitable for the said terminals based upon the data from the said security control means, a connection control means which controls the connection condition with the said terminals and provides the contents of the service converted by means of the said function converting means based upon said connection condition, a first control means, through which said terminal is enabled to readout the specific data, when said terminal is in connection through the said network and also said terminal satisfies the specified conditions to request an access to the specified data, and a second control means which executes a certification processing by means of a proper system and controls the login (logon) processing in accordance with the terminals by means of a proper method depending upon the result of the certification process.

According to the present invention, said access control means is characterized in that the control is executed so as to perform the processing by means of proper connection control system or a manual control system at the said terminals.

Furthermore, according to the present invention, said security control means is characterized in that enciphering is performed by means of a proper system at the said terminal, when an application service is to be supplied.

According to the present invention, said security control means is characterized in that said security control means, said access control means said function converting means have a unified view to the terminal accessing to the network by issuing a new identifier.

According to the present invention, said function converting means is characterized in that said function converting means is provided with a control means of the concerning the said terminals and a means that controls the information regarding the interface with the application service and realizes a communication with the application service.

According to the present invention, said function converting means is characterized in that the data are converted into the form proper for the terminal depending upon communication system that said terminal utilizes.

According to the present invention, said connection control means is characterized in that the interrupted data can be transmitted successively from the interrupted position at the breakdown based upon the record of data conversion record and the record of connection condition to the said terminal.

According to the present invention, said data exchange apparatus and at least one of the said terminal are provided with a remote agent function, and said data exchange apparatus is characterized in that said data exchange apparatus and the said terminal is enabled to execute a data cache function.

According to the said constitution, the work in the office can be performed continuously even in a mobile computing environment. In other words, a supply of an application service can be realized depending upon the processing capacity of the respective terminals and a supply of an application service can be realized depending the communication capacity of the said infrastructure, even if a plurality of communication infrastructures are coexisted.

Furthermore, according to the present invention, a proper countermeasure can be taken even if in the case of breakdown when the communication is interrupted. In addition, in case of a data processing work which requires a long time, the terminal can be utilized effectively and economically with, the security function improved. The login (logon) function also and the maneuverability can be also improved.

BRIEF DESCRIPTION OF THE SEVERAL
VIEWS OF THE DRAWINGS

FIG. 23 is a drawing, which shows the management items for personal data according to the fourth embodiment of the present invention.

FIG. 24 is a drawing, which shows the relation between the name for login and verification process according to the embodiment of the present invention.

DETAILED DESCRIPTION OF THE PREFERRED EMBODIMENTS

Figure 1:
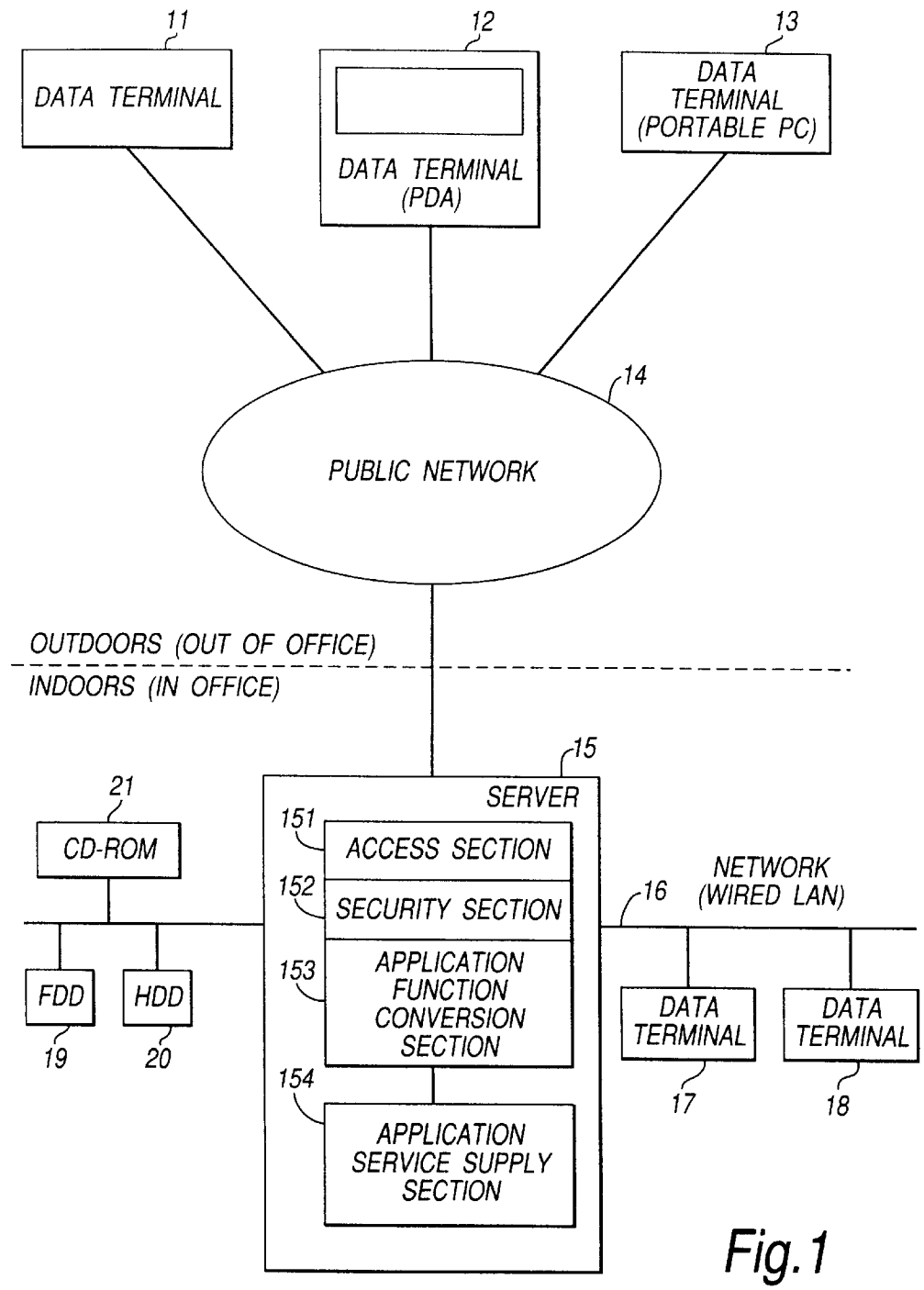
FIG. 1 is a block diagram, which shows the idea of the distributed network computing system according to the first embodiment of the present invention.

Hereinafter, the embodiments of the present invention are described by referring to the drawings.
(First Embodiment)

FIG. 1 is a drawing, which shows a concept of the distributed network computing system according to the first embodiment of the present invention.

The data terminals, 11, 12, 13, which are used outdoors (out of the office), are connected through network 14 to the server computer 15 and are utilized as a network computing system outside of the office. Meanwhile, the data terminal 11 is a telephonic data terminal, such as a smart-phone, the data terminal 12 is a portable data terminal such as a PDA (Personal Digital Assistant) and the data terminal 13 is a portable personal computer (PC). Meantime, the users of these terminals may perform desired works using desktop-type terminals which are indicated by the terminal 17 and the terminal 18, instead of the terminals 11,12 and 13, when they are in the office or indoors such as building or house.

The network 14, to which the data terminals 11, 12 and 13 are connected, is a public telephone circuit, a private telephone circuit, or a network infrastructure such as INTERNET. Physically there are both cases in which the network 14 is wired and wireless. Furthermore, this network 14 is connected to the server computer 15 installed indoors.

The server computer 15 is connected with floppy disc devices (FDD) 19, hard disc devices (HDD) 20 and/or CD-ROM devices 21 as external memories for storing various kinds of application programs and data and is further provided with an access section 151, a security section 152, an application function conversion section 153 and an application service supply section 154 within the computer.

Hence, the access section 151 performs controls for the access from the data terminals by means of dial-up. The security section 152 performs security control function such as verification of the users, who try to access through the network 14.

The application function conversion section 153 performs the conversion according to attribute data of the kind of data which the users of data terminals may utilize. With this data conversion function, the users of the terminals may utilize the network computing system by means of various kinds of data terminals and a network infrastructure. The application service supply section 154 realizes that the user of terminals receive supply of the services from the network computing system. For example, there are group ware/data system including OA system, electronic mail, documentation database, group schedule management, and systems which utilize DBMS (Database Management System) such as an inventory management, etc. Meantime, the application service supply section 154 can be functioned so as to supply a plurality of application services.

The data terminals 17, 18, which are connected to the server computer 15 through the network 16, are the ones which are used by the user of terminals, when they utilize the service function of the server computer 15 in the office or indoors. Meanwhile, the network 16 is physically a communication medium of a high reliability among the communication infrastructures, including wired LAN (Local Area Network), wireless LAN, infrared communication. Also, the users of data terminals 17, 18 may receive the services directly from the application service supply section 154, without passing through the access section 151, the security section 152 or the application function conversion section 153.

Meantime, needless to say, though the server computer is shown as a one computer in FIG. 1, the respective functions of the computer can be distributed in a plurality of computers.

Meantime, when the network computing system is built up, there are several problems caused by the following matters.

to utilize various kinds of data terminals,
to utilize an unstable communication infrastructure,
to make the security function sure,
to utilize various kinds of application functions,
to use the login function effectively.

The data conversion apparatus, which are used in the embodiment of the present invention to solve these problems will be described in detail.

Figure 2:
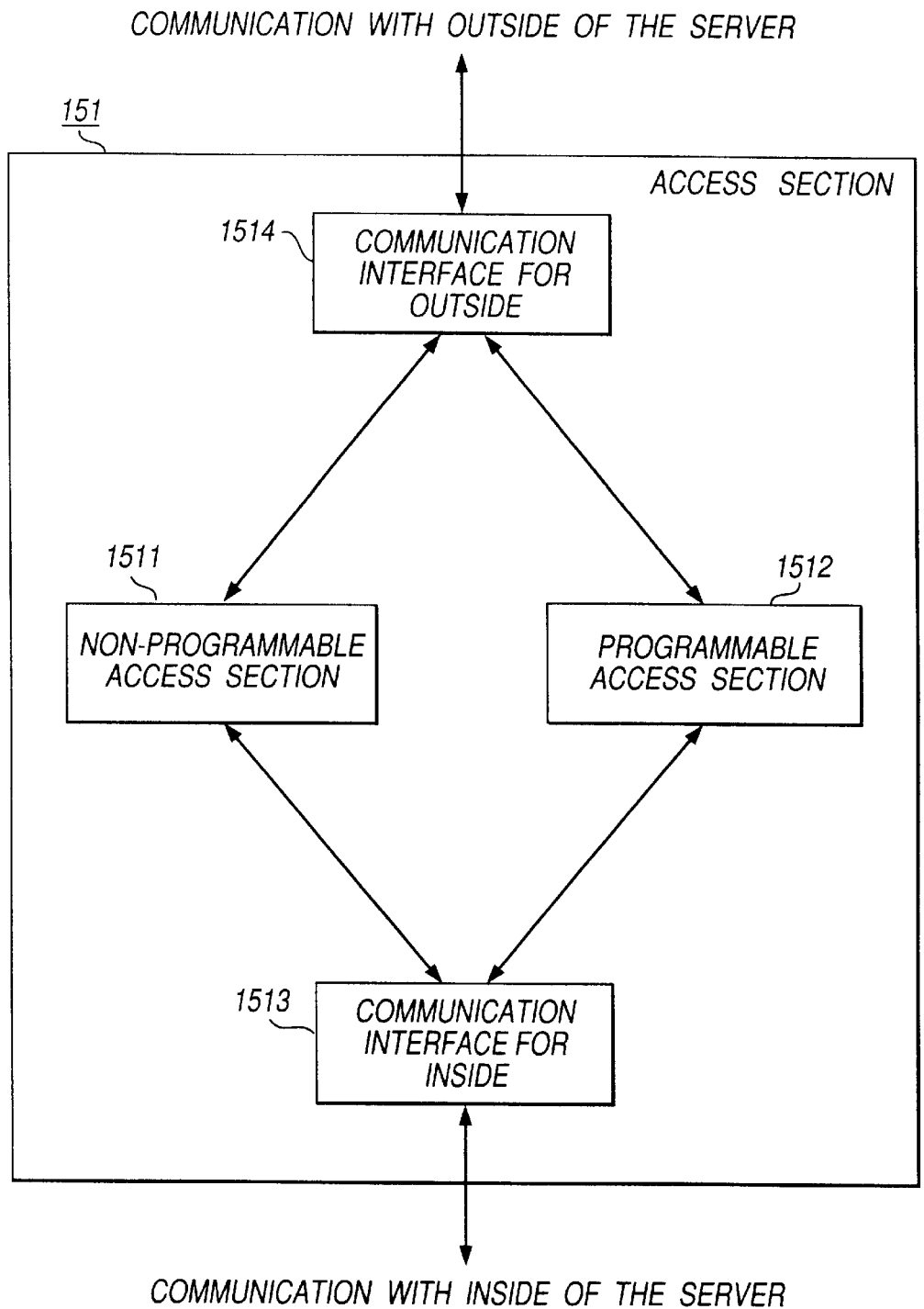
FIG. 2 is a block diagram, which shows an access section according to the embodiment of the present invention.

FIG. 2 is a drawing, which shows the concept of the internal constitution of the access section. For example, in the case of the protocol used generally today for dial-up service to the indoors server computer, there is a PPP (Point to Point Protocol). The access utilizing this PPP can be used by the data terminal 12 or the data terminal 13, however, can hardly be used by the terminal 11. This is due to the fact that the data processing function, which controls the PPP protocol, is not hardly be provided as the data processing capacity of the terminal 11 is relatively low, when the data processing capacity of the terminal 11 is compared with the ones of the data terminals 12, and 13.

Figure 3:
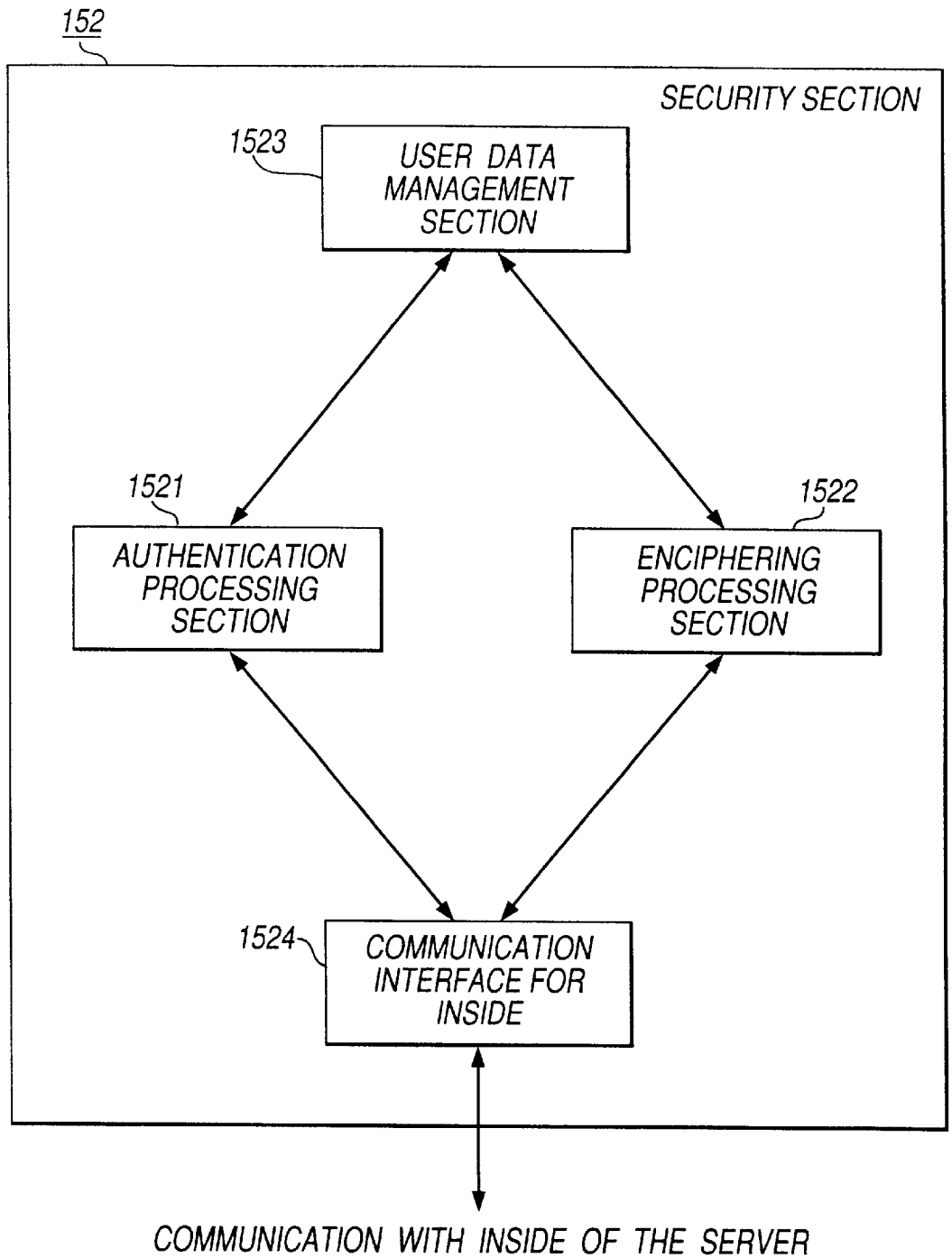
FIG. 3 is a block diagram, which shows a security section according to the said embodiment of the present invention.

To more particularly explain, a case that only an access from the terminal by means of a non-programmable control is possible, can be considered. Therefore, the non-programmable access section1511, which enables a non-programmable access and the programmable access section 1512, which enables a programmable access such as PPP are provided in the access section 151. Furthermore, as explained later, the access section 151 is provided with an interface function for the server computer to access the outside interface by communicating with the security section 152 and the application function conversion section 153 (internal communication within the server). In this connection, the access section 151 is provided with an internal communication section (communication interface for inside)1513, which has an internal communication interface function for performing a communication with other components in the server computer 15 and a external communication section (communication interface for outside) 1514, which has an external communication interface function for performing communication outside of the server computer 15. Meanwhile, in case of the actual execution, an non-programmable access section 1511 and a programmable access section 1512 may be provided with internal/external communication functions, so that the non-programmable access section 1511 or the programmable access 1512 may execute internal communication or external communication independently. Also, the said external communication section 1514 is provided with a communication port, by which one can know from what kind of data terminal access is performed. In other words, the port for the access from the data terminal 11 and the port for the access from the data terminals 12, 13 are distinguished by the difference of the telephone numbers. Meantime, needless to say, it is also possible to compose the server so that the kind of the data terminal can be judged at the access section 151 by discriminating the telephone number of the data terminal which is accessing, for example, by referring to an access discriminating data table, which is provided within the computer but not shown in the drawing, FIG. 3 is a drawing, which shows the internal constitution of the security section 152. The security section 152 is provided with a certification processing section (authentication processing section) 1521, which processes the certification of the users and a code processing section (enciphering processing section) 1522, which enciphers the data in the network 14 and 16 as well as the server computer 15. And also, in the security section 152, there is personal data management section (user data management section) 1523, which sets up and manages the personal data for certification and the data for establishing the propriety of enciphering. Furthermore, the security section 152 is provided with an internal communication section (communication interface for inside) 1524, which is provided with an internal communication interface function for performing communications with the other components within the computer 15. Meantime, needless to say, it is also possible to have the certification processing section 1521 or the code processing section 1522 provided with an internal communication function.

Also, for the enciphering of the data, it is necessary to have the enciphering and deciphering functions between the both sides of the communication. As to the propriety of enciphering at the respective sections within the apparatus according to the embodiment of the present invention, the code processing section 1522 is to manage the data.

Figure 4:
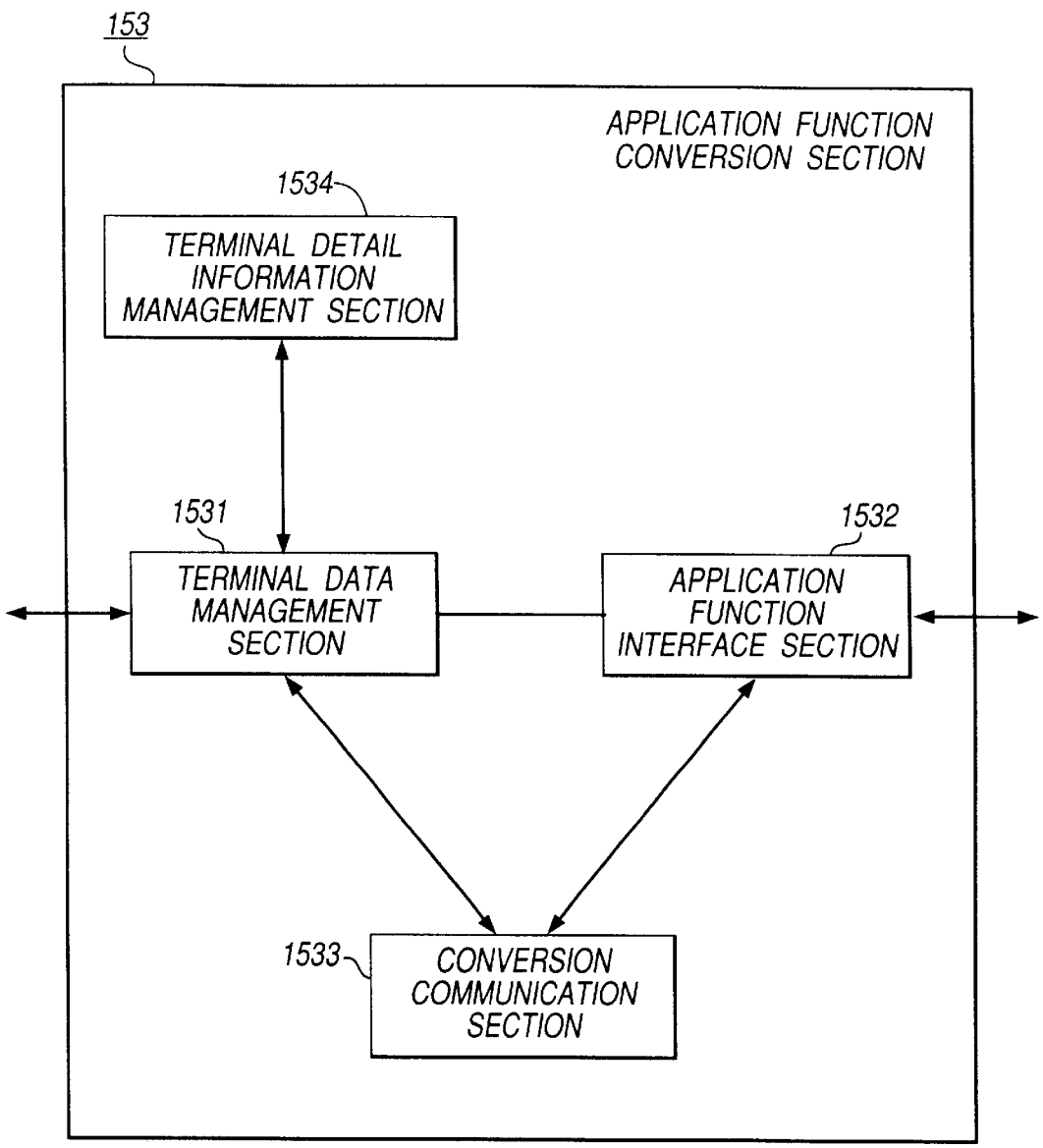
FIG. 4 is a block diagram, which shows an application function converting section according to the said embodiment of the present invention.
Figure 5:
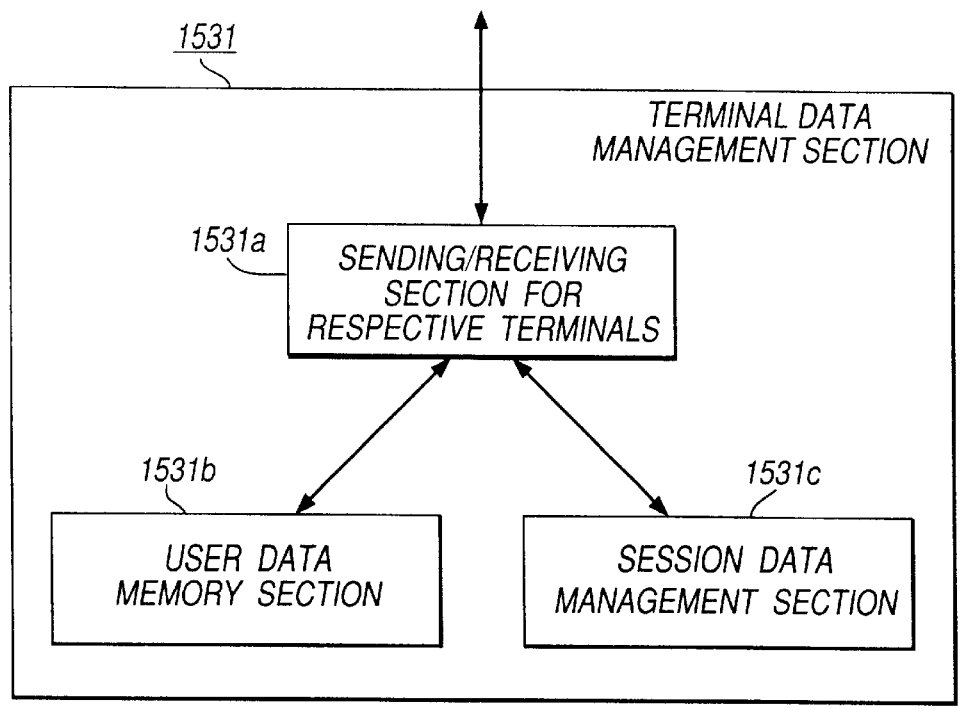
FIG. 5 is a block diagram, which shows a data processing section for respective terminals according to the embodiment of the present invention.

FIG. 4 is a drawing, which shows the internal constitution of the application function converting section 153. At the network computing system, which is a object of the embodiment of the present invention, there are various kinds of data terminals as shown in FIG. 1. (Data terminals 11, 12, and 13 are indicated in FIG. 1). Therefore, it is necessary to provide a communication system proper for the data terminal. For example, it is necessary to distinguish the attribute used by WWW(World Wide Web) from the attribute of the terminal for a certain non-programmable terminal system. For example, in case of the non-programmable terminal, it is necessary to supply the data from the application service supply section to display in accordance with the display size and display capacity. Therefore, there is a data processing section for respective terminals (terminal data management section) 1531 in the application function conversion section 153. Though the communication control systems and the data display systems are different according to the terminal used by users, the data processing section for respective terminals 1531 is to absorb such differences. Meanwhile, in the case of an actual apparatus, data processing section for respective terminals 1531 can be realized by providing a data processing section for each attribute of terminals. Also, the data processing section for respective terminals 1531 is provided with a communication interface function for performing communication with the other components in the server computer 15, and performs communication with the access section 151 and the security section 152.

Next, at the application function conversion section 153, the function to supply the service which desired by the user, is realized by performing a communication through a suitable system for the data terminals 11, 12, 13 and their control systems. For this purpose, the application service supply section 154 and an application function interface section 1532, which performs communications, are provided. Meantime, in the case that the application service supply section 154 is realized as a software, the application function interface section 1532 can be realized as a software, in which API (Application Programming Interface) supplied by the application service supply section 154 is used. Also, the application function conversion section 153 is provided with a converting communication section 1533 in order to communicate data by means of a data processing section for respective terminals 1531 and an application function interface section 1532. The data processing section for respective terminals 1531 does not require any data regarding the application service supply section 154, and the application function interface section 1532 does not require the data regarding the attribute of the terminals. Furthermore, application function conversion section 153 is provided with a terminal data management section (terminal detail information management section) 1534. The terminal data management section 1534 possesses the detailed data regarding the data terminals, and the data processing section for respective terminals 1531 performs the data processing basing upon the said data. Meantime, in the case of the actual apparatus, when it is provided as a software, the data processing section for respective terminals 1531 can be realized as an object which succeeds the terminal data management section 1534.

Next, the concept of the internal constitution of the said application function conversion section is described. As described in the above, the application function conversion section 153 is provided with a data processing section for the respective terminals 1531, an application function interface section 1532 and a conversion communication section 1533.

The data processing section for the respective terminals 1531 is provided with a sending/receiving section for the respective terminals 1531a, a memory section for the users data 1531b and a connection data procuring section (session data management section) 1531c, which acts as connection data procuring section.

The data receiving/sending section for the respective terminals 1531a receives and sends the data depending upon the attribute of the data terminal, which is used by the users who use the embodiment of the present invention. In this connection, the attribute of the terminals means the program used by the terminal and the size of the display. Meantime, in the actual execution, the data receiving/sending section for the respective terminals 1531a can be realized as a succeeded object of the object which stores the attributes of the respective terminals, or as a separate object for each terminal by means of a method, which is started when a connection with one of the respective terminals is established.

The user data memory section 1531b is to obtain the data such as discriminator which exist in the personal data management section 1523 of the security section 152 and to provide data of the user to the data processing section for the respective terminals, when the user of terminal accesses through the server system of the present invention.

The connection data procuring section 1531c is to control the connection data with the application service supply section 154 through the data terminal and the server system of the present invention. Especially, as described later, the connection data procuring section 1531c provides the data for the restoration of the condition of the circuit connection in case that the circuit is broken down.

Figure 6:
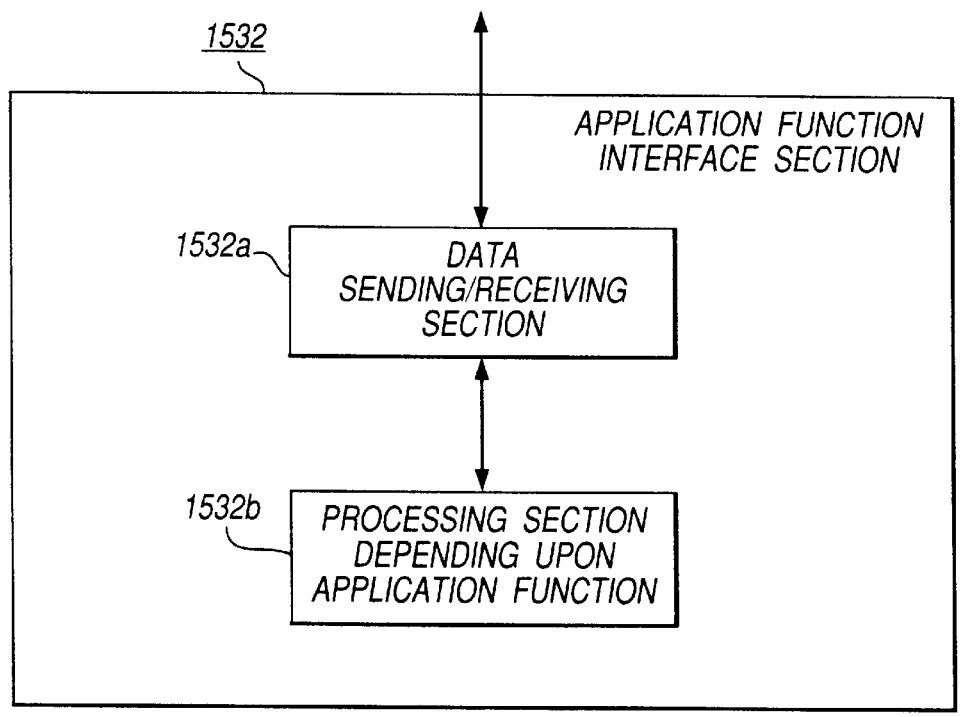
FIG. 6 is a block diagram, which shows an application function interface section according to the embodiment of the above invention.

FIG. 6 is a drawing, which shows a concept of the internal constitution of the application function interface section 1532. The application function interface section 1532 is provided with a data sending/receiving section 1532a and a processing section depending upon the application function 1532b.

The data sending/receiving section 1532a is to send and receive the data, when application function interface section 1532 performs communication with the conversion communication section 1533 or the application service supply section 154. Meanwhile, in the case of actual execution, the sending/receiving section for the application service supply section 154 and the sending/receiving section for the conversion communication section 1533 can be provided independently. In case these are provided independently, the sending/receiving section for the application service supply section 154 can be also realized as a software module utilizing API, which is supplied by the application service supply section 154.

The processing section depending upon the application function 1532b is provided for the purpose that data processing with the application service supply section 154 is performed actually by means of the data sending/receiving section 1532. Also, for example, data conversion from the basic standard document form to the data format depending on the application function can be performed.

Figure 7:
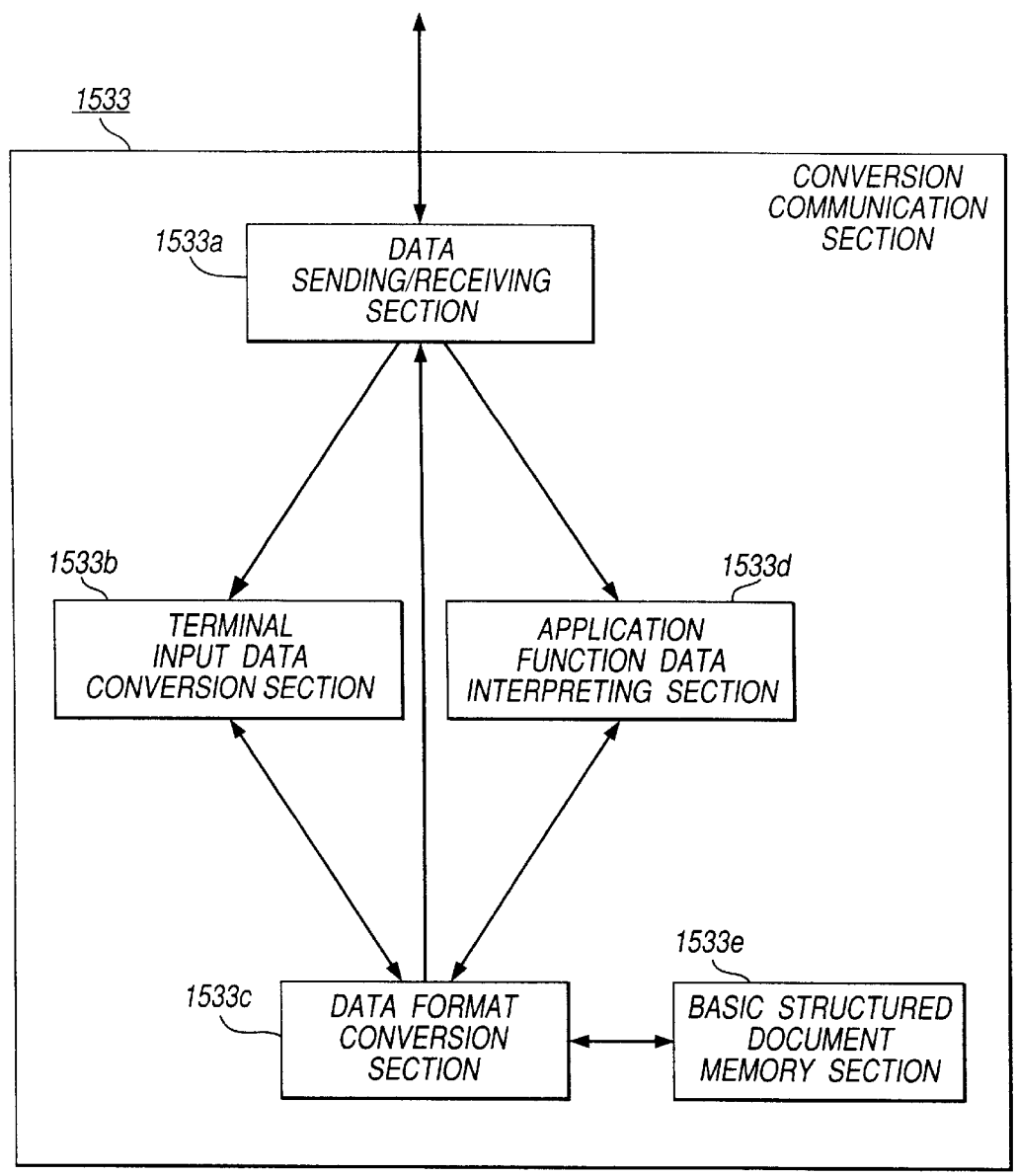
FIG. 7 is a block diagram, which shows a conversion communication section according to the said embodiment of the present invention.

FIG. 7 is the drawing of the internal constitution of the conversion communication section 1533, The conversion communication section 1533 is provided with a data sending/receiving section 1533a, the data conversion section for the inputted data at terminal (terminal input data conversion section) 1533b, data from conversion section (data format conversion section) 1533c, the application function data interpreting section 1533d and a storing section of the documents converted into the basic format 1533 e.

The data sending/receiving section 1533a is activated, when the conversion communication section 1533 communicates with data processing for the respective terminals 1531 or the application function interface section 1532. Meanwhile, in the actual execution, the data sending/receiving section 1533a can be realized as the successor of the object, which is provided with the respective attributes of the terminals.

The data conversion section for the data inputted at the terminal 1533b functions as follows. Namely, for example, in case of the WWW, which is a standardized user interface in INTERNET, the user may transmit the data on the display to the linked position by clicking the link point. However, this function may be realized by clicking the icons on the display or a system selecting the number from the menu display can be utilized. By using the server system of the present invention, the same service can be supplied to any user who utilizes any kind of terminal, as the difference of the attribute of the terminals is absorbed. The substance that absorbs the difference of the controllability on the side of the terminals, is the data conversion section for the data inputted at the terminal 1533b. in other words, for example, the case that number is selected from the menu display and the case that the link point is clicked at WWW, will be described hereinafter as an equivalent.

The data form conversion section 1533c is to convert the data which have been transmitted from the thermals and the application service supply section 154 to the common structured language format, which is used in this apparatus. Meantime, in the case of actual execution, in order to increase the efficiency, the object, which converts the data from the terminal to the common format and send the same to the sending/receiving section and the object which converts the data from the application service supply section 154 to the common format can be realized as a separate object, which succeeds the conversion into the common format.

The application function data interpreting section 1533d is to perform the interpretation, so that the data sent from the application function interface section 1532 can be converted into the common structured language format.

The storing section of the documents converted into the basic format (basic structured document memory section) 1533e is to store the data regarding the conversion rules and various data regarding the conversion, which are referred to when the data format conversion section 1533e performs the conversion of the data into the common structured language format.

Regarding the said constitution, its action/function is described hereinafter.

Figure 8:
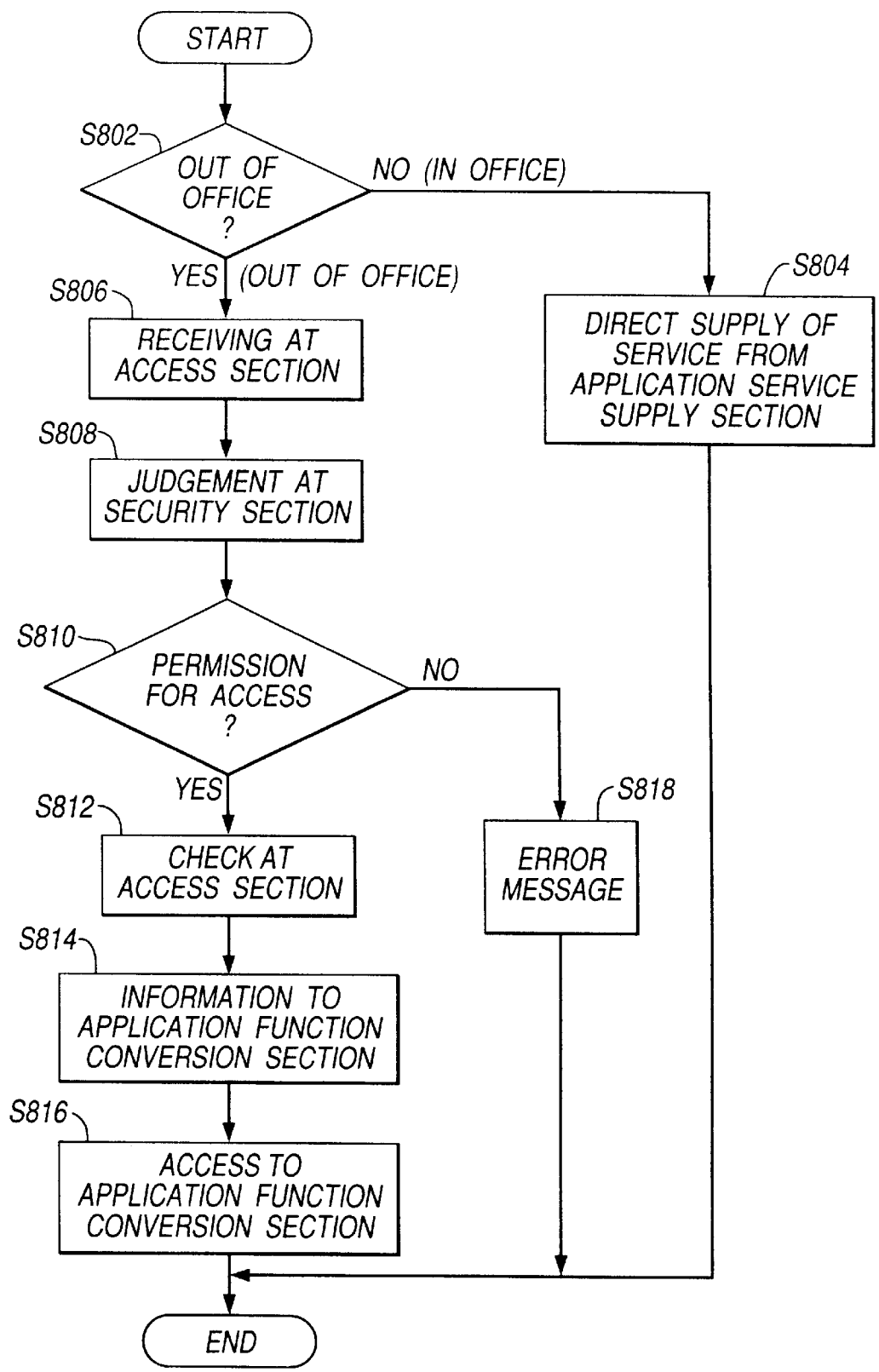
FIG. 8 is a flow chart, which shows an access process by the data terminal on the side of the server computer according to said embodiment of the present invention.

FIG. 8 is the flow chart which shows an access processing from the data terminal on the side of the server computer.

Especially, FIG. 8 is the flow chart, which shows the relation among the access section 151, the security section 152 and the application function conversion section 153.

First, when the access to the server computer is made by a data terminal, it is judged, whether the said access is made indoors and from a data terminal in the office, or outdoors and from a data terminal outside of the office (STEP S802).

When the access is made from indoors/office (NO of STEP S802), namely the access is made from the data terminal 17 or 18, the data terminal 17 or 18 receives service supply directly from the application service supply section 154 (STEP S804).

On the other hand, when the access is made from the data terminal outdoors/outside of the office (YES of STEP S802), the access section 151 receives the access at first (STEP S806). In this occasion, the attribute of the terminal can be obtained, by providing accessing interfaces for the respective terminals and communication infrastructures. Meantime, any wrong access can be caught up by obtaining/log the access data at the access section 151.

Next, the access section 151 requests the security section 152 to confirm the propriety of the access (STEP S808). In this case, certification processing and the necessity of enciphering is judged for the communication line. Meantime, this judgment of the content is made basing upon the data of the personal data management section 1523.

When the access is approved by the security section 152 (YES of STEP S810), the security section issues newly a discriminator. The issued discriminator is confirmed at the security section 151 (STEP S812), and this effect is conveyed to the application function conversion section 153 (STEP S814). Upon receipt of the information, the application function conversion section 153 approves the application service supply section 154 to have the data terminal to access to the desired application software (STEP S816).

In the meantime, when the access is judged wrong from the result of the judgment at the security section 152 (NO of the STEP S810), the access section 151 issues an error information to the user (STEP S818).

Meantime, it is of course acceptable to convey the said effect to the application function conversion section 153, even when the access is judged right. In this case, the newly issued discriminator is conveyed to the application function conversion section 153 at the same time, In this way, among the three partners of the access section 151, the security section and the application function conversion section 153, a unified comment as to the users access is maintained. For example, even when the data terminals are different and an access is made to the server computer using the same pass words, the said communication partner can be discriminated without fail and a proper supply of the data can be achieved.

Figure 9:
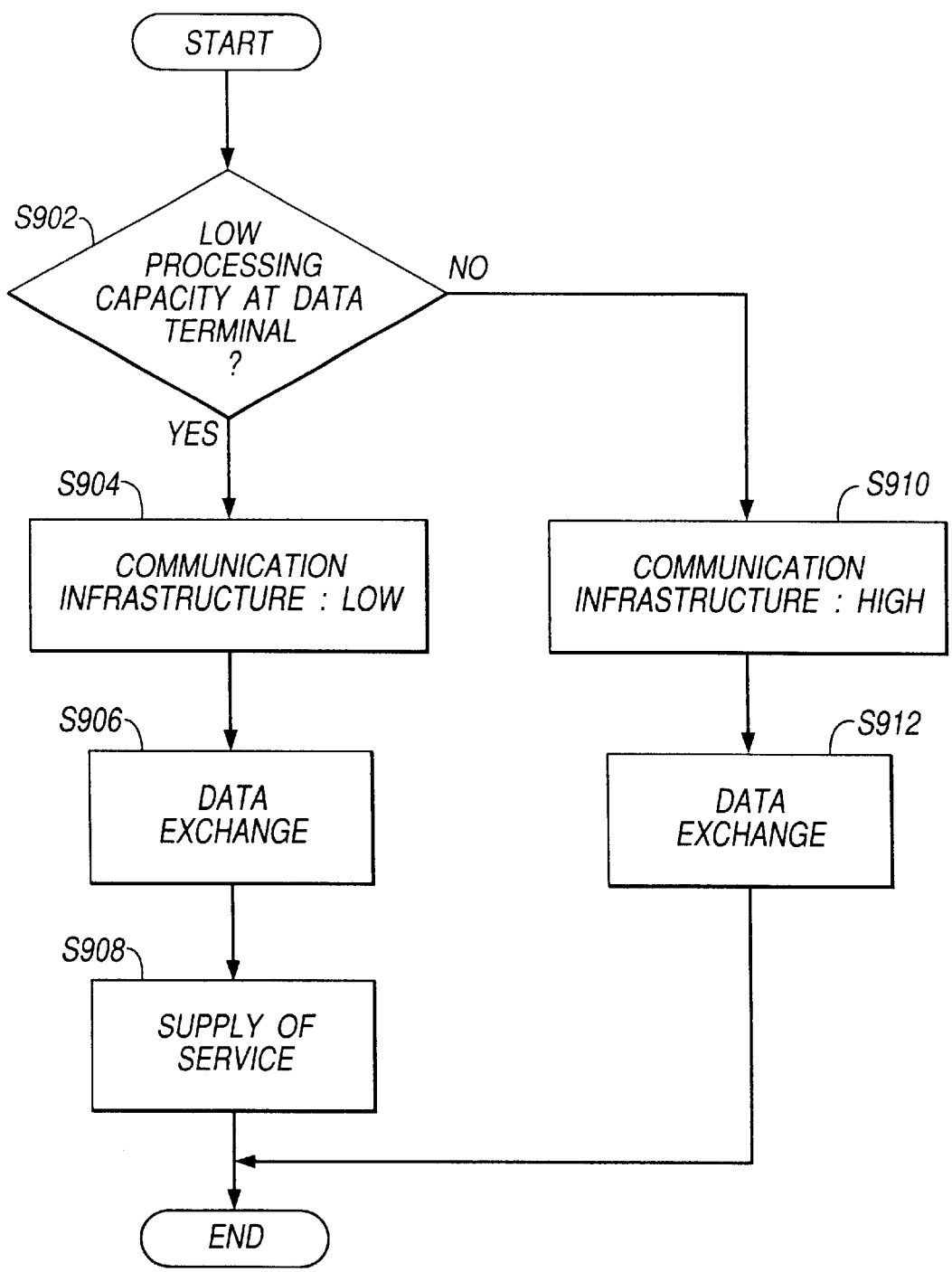
FIG. 9 is a flow chart, which shows a data exchange process on the side of the server computer according to said embodiment of the present invention.

The data terminal which is approved to access to the application service supply section 154 as described in the above, can receive a supply of the desired application service by the application service supply section 154, according to the processing capacity of the said terminal and the kind of the communication infrastructure. This flow is shown in the flow chart of FIG. 9.

In case that the processing capacity of the data terminal is low (YES of STEP S902), for example, when a telephonic terminal 11 is in question, the capacity of the communication infrastructure is judged also low (STEP S904), the application function conversion section 153 supplies a service (STEP S908) after the application software is converted into a non-programmable data terminal, for example, binary data is converted into a text data(STEP S906).

On the other hand, in case the processing capacity of the terminal is high (NO of STEP S902), for example, when terminal such as PDA 12 or portable PC 13 is in question, capacity of the communication infrastructure is also judged as high (STEP S910), the application function conversion section 153 supplies a service (STEP S908) after the application software is converted into a programmable data terminal, for example, image data is converted into a symbol data (STEP S912).

In the meantime, as the said server computer is constituted so as to judge the kind of the accessing terminal and the kind of the infrastructure at the accessed communication port, a user of the terminal 12, 13 of the terminal of high processing capacity can receive also the service of the converted data by using intentionally the communication port of low data processing capacity and of low infrastructure.

Figure 10:
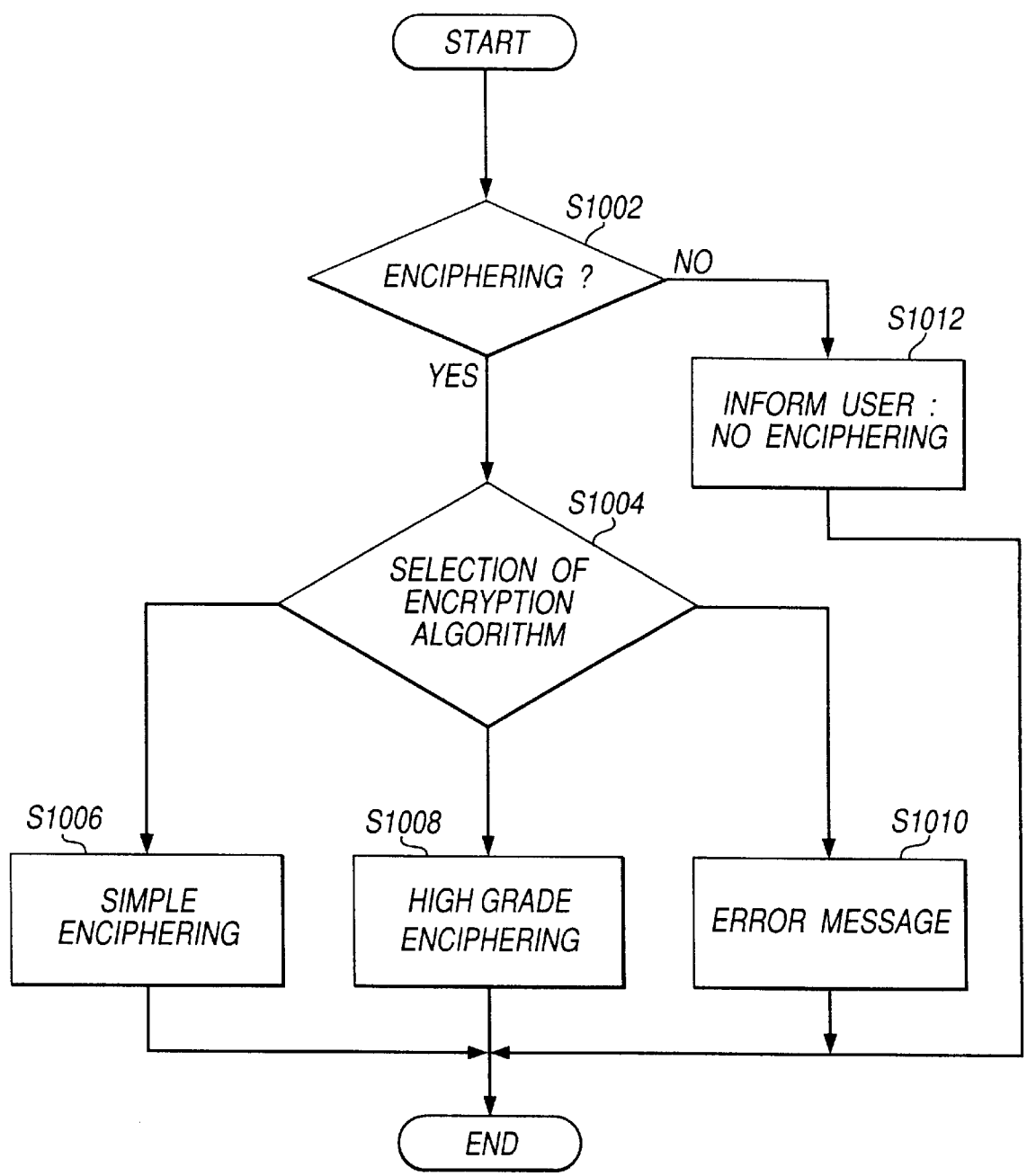
FIG. 10 is a flow chart, which shows an enciphering process on the side of the server computer according to said embodiment of the present invention.
Figure 11:
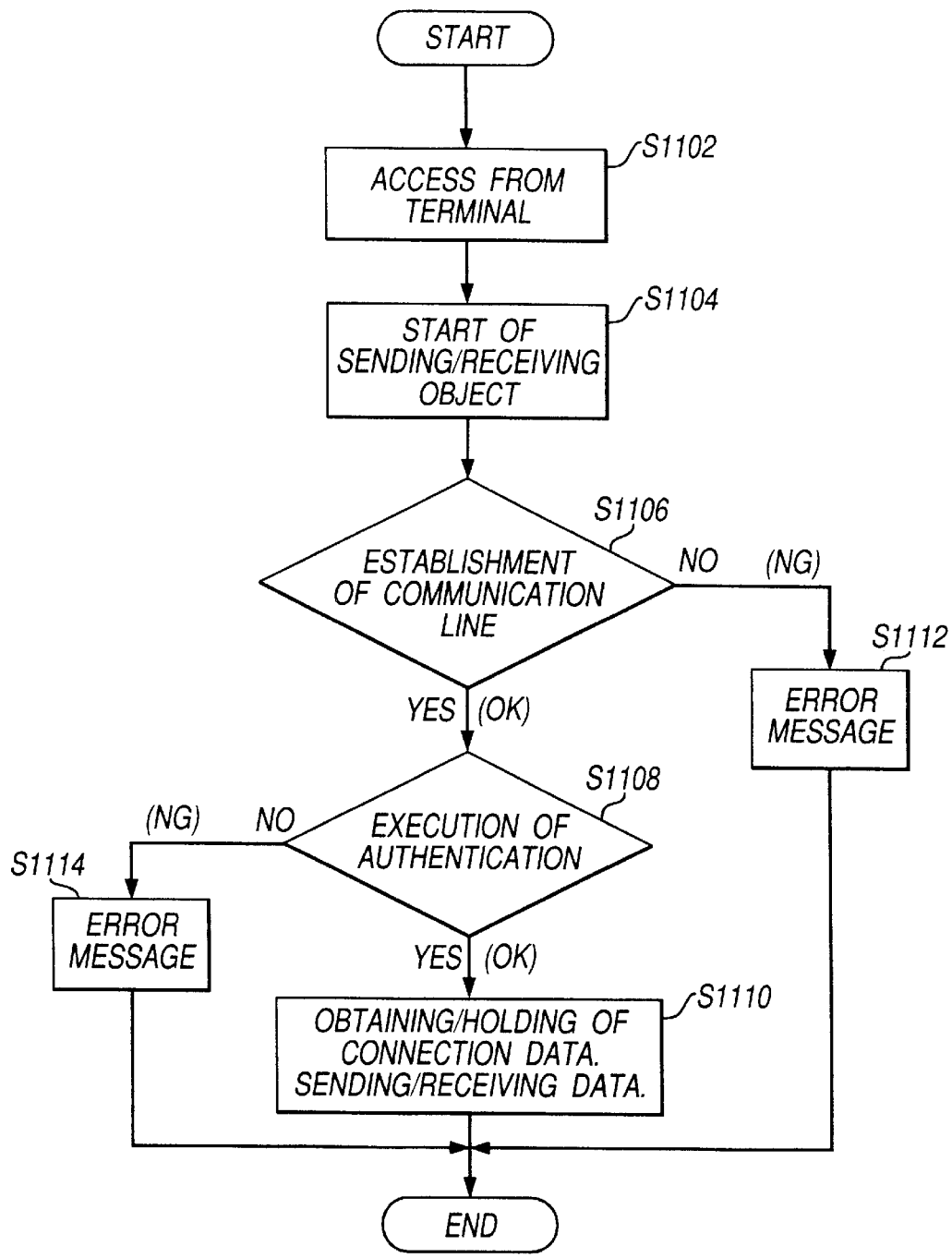
FIG. 11 is a flow chart, which shows a concept of the network computing system according to the embodiment of the present invention.

As described in the above, the data terminal, which is enabled to access to the application service supply section 154, receives an desired application service, which are converted by the application service supply section 154 according to the processing capacity of the terminal and the kind of the communication infrastructure When receiving an application service, it is desirable that the data are enciphered to keep a secret. This processing is described using the flow chart of FIG.10, First, whether or not the data shall be enciphered, is judged on the side of the server computer 14 (STEP S1002). This judgment can be made basing upon the data from the communication port and security section 152, the application function conversion section 153 and also may be judged depending upon the negotiation regarding the enciphering between the terminal and the server computer.

In case that the data shall be enciphered (YES of STEP S 1002), a judgement of the enciphering system is made (STEP S1004). This judgement is made by referring to a table regarding the data terminals to be accessed stored in the server converter 15. And, according to the result of the judgment at the server computer 15, a negotiation for confirmation is performed as to whether or not the decided enciphering system to be sent to the terminal is acceptable.

In other words, when the server computer 15 judges that the processing capacity of the data terminal and the capacity the communication infrastructure are low, and the said terminal confirms that the enciphering system suitable for the said terminal is acceptable, the security section 152 applies a simple enciphering system (STEP S 1006). If the data terminal does not accept the enciphering system judged by the server computer, an error information is sent from the server computer 15 to the data terminal, and the enciphering is not performed (STEP S1010).

On the other hand when the server computer 15 judges that the processing capacity of the data terminal and the capacity the communication infrastructure are high, and the said terminal confirms that the enciphering system suitable for the said terminal is acceptable, the security section 152 applies a high grade enciphering system (STEP S 1008). If the data terminal does not accept the enciphering system judged by the server computer, an error information is sent from the server computer 15 to the data terminal, and the enciphering is not processed (STEP S1010).

Meantime, for the terminals, which cannot accept the complex processing, it may be constituted, so that an effect that enciphering is not performed, is conveyed to the terminal in advance.

Also, the enciphering can be made optional according to the intention of the user of the terminal and also whether or not enciphering is made, is set in advance according to the kind of the application services. And it is also possible to advise to the terminal that the application service is not enciphered. Also for the terminals which data processing capacity is judged low and the reliability of communication infrastructure is judged poor, the enciphering is not performed from the beginning and the said effect can be advised to the terminal.

Furthermore, of course, the enciphering can be performed so that a compression is executed according to the attribute of the communication infrastructure.

Next, the flow of the processing at the data processing section for the respective terminals 1531 is described. Here, the case that the data sending/receiving section for the respective terminals 1531a lets the sending/receiving object start by means of software, is described. The data processing section for the respective terminals 1531 executes the processing for sending. receiving the data depending on the attribute of the terminals.

First, the data sending/receiving section for the respective terminals 1531a receives an access signal through the access section from a data terminals (STEP S1102). At this time, the data sending/receiving section for the respective terminals 1531a have sending/receiving object for the respective terminals start based upon the data regarding the attribute from the terminals (STEP S1104). In this case, the attribute data of the terminal succeeds the data of the terminals data management section 153. In this connection, as to the attributes of the respective terminals, the following cases cam be considered.

the attribute of the terminals is registered in advance at the terminals data managing section.

At the time of the connection with the terminals, the attribute is registered automatically at the server.

At the time of the connection, the menu is displayed for the user, and the user is to select the attribute.

After the sending/receiving object starts, the communication line is established (STEP S1106). In case that the communication line is established normally (YES of STEP S1106), the verification processing is executed. At this verification processing, the verification is executed using a identifier, which is prepared by the security section 152 and used within the server computer, besides the ID and the password, which are used by a user. After the verification is executed, the connection is fixed based upon the identifier. Meantime, verification data held at the users data memory section 1531b and the verification processing obtain the data from the security section 152 (when the first verification processing is performed at the security section 152.) After the verification is processed, the connection data with the terminals is stored in the connection data procurement section 1531c (STEP S1110), while the terminals receives the services of application function through the data processing section for the respective terminals 1531.

In this connection data means a logical connection relation. When the circuit is cut off normally, the connection data are released, however, the circuit is not cut off normally, the connection data are held, the processing can be recovered by said connection data at the next connection of the circuit. For the condition just before the breakdown of the circuit can be recovered by holding the data just before the breakdown of the circuit, when the connection between the server computer 15 and the terminals is broken down, Also, as described later, the sending/receiving object for the respective terminals receives the data in the basic standardized format from the conversion communication section 1533 and the sending/receiving object for the respective terminals converts the data from the basic standardized format into the data format adjusted for the attribute of the terminals. Furthermore, when the data shall be sent to the conversion communication section 1533, the data is transferred together with the control data/parameter so that the data can be converted into the basic standardized document.

Meantime, when the communication line is not established at the STEPS 1106 (NO of the STEP S1106), an error message is displayed and the communication line is processed as an error and processing is finished. Also, when the verification processing is failed at the above step S 1108 (NO of the STEP S1108), an error message is displayed and the communication line is processed as an error and processing is finished.

Figure 12:
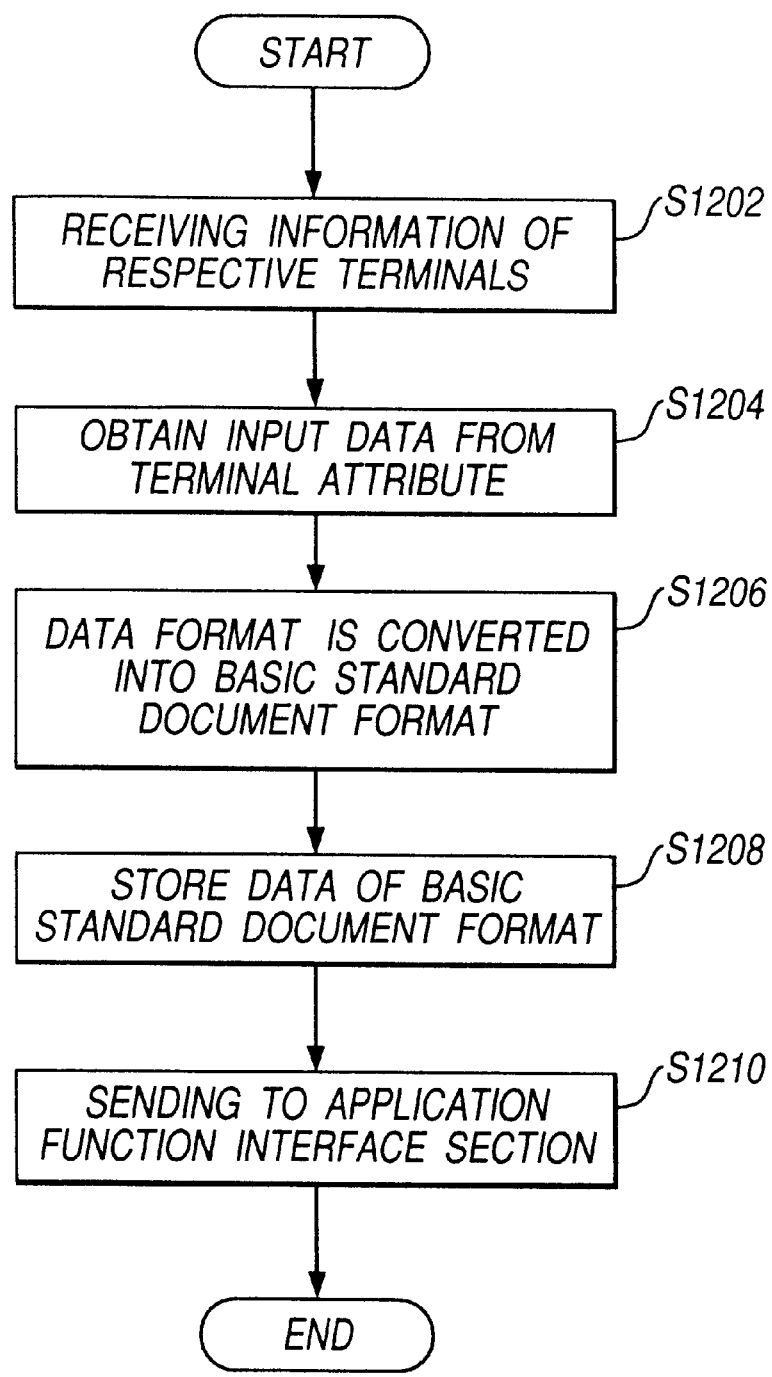
FIG. 12 is a flow chart, which shows a process flow mainly by the conversion communication section, and more particularly, which shows the data flow from the data terminals to the application service supply section according to said embodiment of the present invention.
Figure 13:
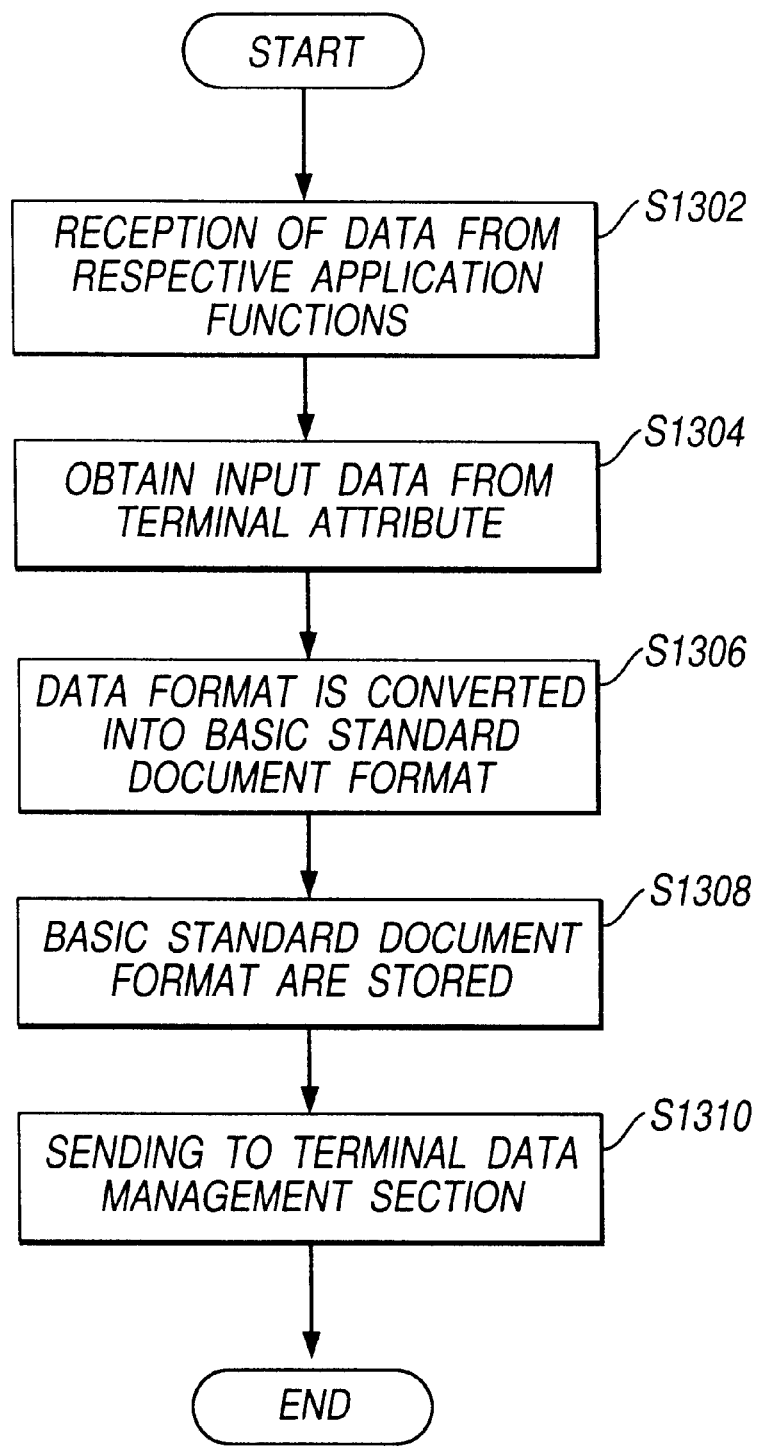
FIG. 13 is a flow chart, which shows a process executed mainly by the conversion communication section, and more particularly, which shows a data flow from the application service supply section to the data terminals according to the embodiment of the present invention.

Next, the processing flow at the conversion communication section 1533 is described by referring to the flow charts of FIGS. 12 and 13. The conversion communication section 1533 performs a processing to convert the data based upon the attribute of the terminals and the services attribute supplied by the application function into the basic standardized document format. The basic structured document is the format which controls the data within this system. Meanwhile, the basic structured document can be realized using the grammar of HTML (Hyper Text Markup Language), which is used at present in the field of INTERNET almost as standard depending upon the content of the services provided by the application function.

The flow of the data from the data terminals to the application function conversion section 153 and application servicesupply section 154 is described by referring to FIG. 12. First, the data with an attribute of the terminals is received (STEP S1202) and the data inputted from the side of the terminals is procured from the data of the attribute of the terminals (STEP S1204). The procured data is converted into the basic structured document format (STEP S 1206). When the data is converted into the basic structured document, the result is stored in the basic structured document storing section 1533e (STEP S1208). And then, the same data are sent to the application function interface section 1532 (STEP S1210).

Next, the data flow from the application servicesupply section 154 and application function conversion section 153 to the terminals is described by referring FIG. 13. First, the data from the application servicesupply section 154 are received (STEP S1302) and the data provided by the application servicesupply section 154 from the attribute data/parameters of the application function are procured (STEP S1304). The procured data is converted into the basic structured document format (STEP S 1206). When the data is converted into the basic structured document, the result is stored in the basic structured document storing section 1533e (STEP S1308). And then, the same data are sent to the data processing section for the respective terminals 1531 (STEP S1310).

Also, when the breakdown of the circuit is detected by the sending/receiving section, as the connection (session?) is held, at the next connection, the connection (session ?) and the content of the basic structured document storing section can be coincided.

As described in the above, a work equivalent to the work in the office can be performed successively even in the mobile computing environment according to the embodiment of the present invention. In other words, a supply of the application services depending upon the processing capacity of the data terminals is enabled, and it is possible to supply the application services according to the communication capacity of the communication infrastructure, even in the case, where a plurality of communication infrastructures mixed exist.

Furthermore, even in the case that the communication is interrupted halfway, at the next connection, the data sending/ receiving can be restarted from the point of the breakdown. And, by utilizing this function, at the data processing work, which requires a long time, after the data terminals instructs said data processing work by connecting to the server computer, the connection is once cut off, and after a certain time the connection is rebuilt, the data terminals is possible to obtain the processed result immediately. Furthermore, the case that the data terminal stays occupied and cannot perform any other task for a long time as in the past, can be prevented and the data terminals can be used effectively. Furthermore, the increase of communication charge due to the fact that the connection between the data terminals and the server computer 15 has to be kept for a long time, can be avoided according to the embodiment of the present invention, which is excellent economically.

And, also the security function can be improved according to the embodiment of the present invention.

Meantime, the aforementioned method as programmed data which can be executed by a computer, of course, can be applied to various kinds of apparatuses, and can be conveyed through communication media to various kinds of apparatuses for application, by writing in semiconductors memories, for example, floppy disks to be equipped in FDD 19, optical memory disk devices such as FDD 20, CD-ROM 21 and DVD. The computers (server computers), which can realize these apparatuses, are to execute the aforementioned processing by reading out the programmed data stored in the memory media and by being operated by said programmed data.

(Second Embodiment)

Hereinafter, the second embodiment of the present invention is described. Identical or corresponding parts or functions as in the first embodiment are designated by like reference numerals and the explanations therefor are eliminated. In this embodiment, the circuit recovery function and asynchronous processing function when the circuit is broken down, are described. Meantime, in this embodiment, the explanation is made based upon the technologies related with INTERNET, which attracts attention extremely in network computing environment today, however, the intent of this embodiment is not limited to the application to the INTERNET environment. The reason, why the explanation is made by referring to the technologies related to INTERNET, is that the same technologies have established typical protocol such as HTTP and that it is not necessary to explain the processing depending upon interface of the individual application functions.

In the network computing environment, which is the object of the present invention, it is necessary to support various communication infrastructures. In the various communication infrastructures, which are referred here, are a communication infrastructure, which is unstable in quality, a communication infrastructure, which transmission performance is inferior, and also a communication infrastructure, which circuit charges (communication costs) are expensive, are involved. Therefore, while paying attention to the communication protocol which is used for the application function conversion section 153 and application servicesupply section 154, a embodiment, which can solve the present problems without exerting any influence to the application services function used normally is explained.

Figure 14:
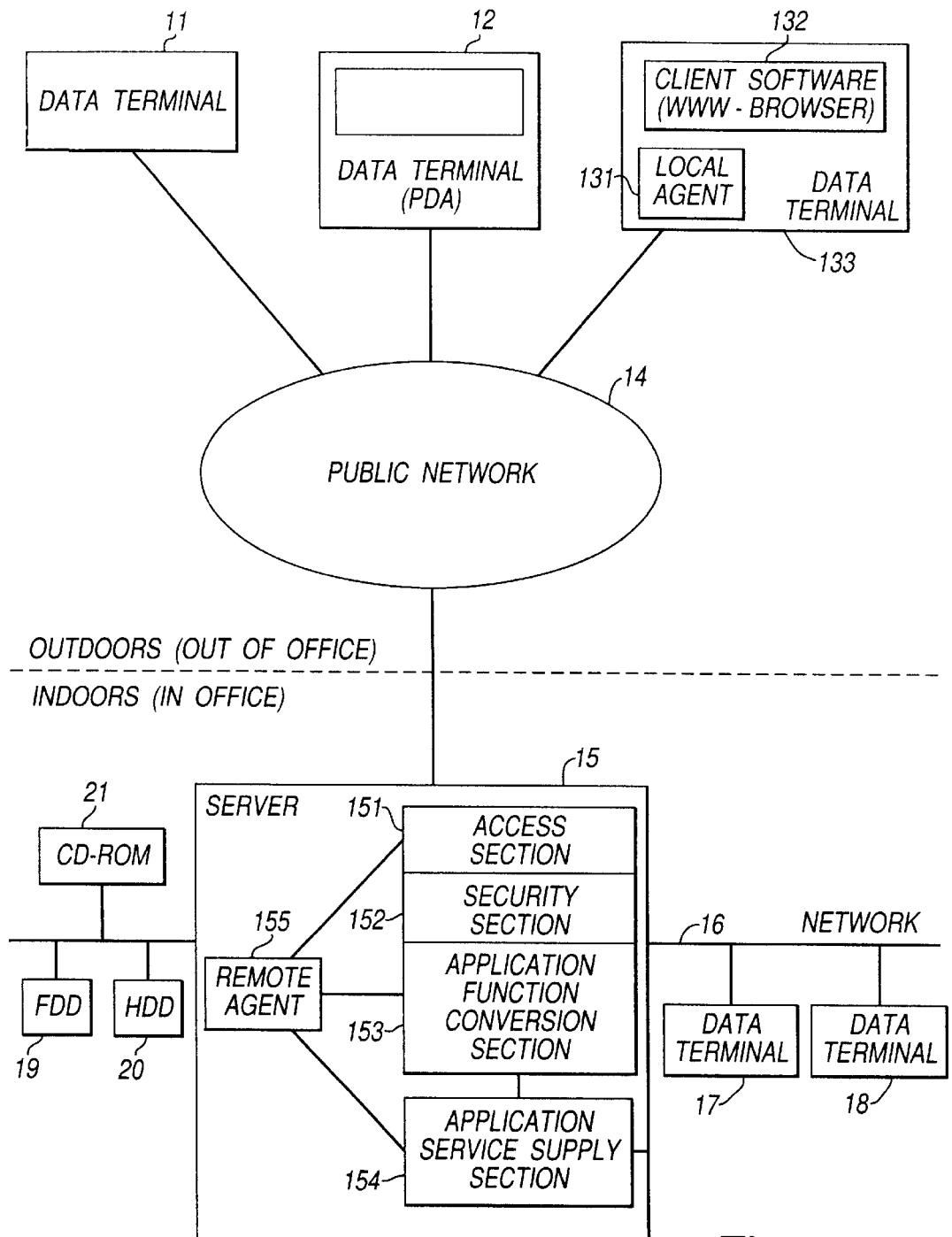
FIG. 14 is a block diagram, which shows a concept of the network computing system according to the second embodiment of the present invention.

FIG. 14 is a drawing which shows a concept of the constitution of a network computing system including a countermeasure function for circuit break-down by incidental accident or like and asynchronous processing function. It is explained that in this embodiment a local agent 131 in charge of local agent function existing in the data terminals 13 used by the user, and a remote agent 155 in charge of remote agent existing in the server computer solve the problems by intermediating the communication between WWW-browser; and WWW-server. In this connection, the local agent is installed in the data terminals 13 and is to realize a intermediating between the client software, which is also installed in the data terminals 13 and the server system. On the other hand, the remote agent is installed in the server computer and is to realize an intermediating between the server software, which is also installed in the data terminals 13 and the client system. Meantime, said server system means a software or a remote agent, and the client system means a client software or local agent. Meantime, in case the user does not use the function according to the embodiment of the invention though said function is installed, the apparatus in which said function is installed, functions just as a data transmission apparatus or a data cache, and therefore, the end-user environment is not influenced at all by mounting said function. Also as described later, by realizing the constitution, wherein the agent is equipped with a data cache function, and WWW-browser; or like is not equipped with a data cache function, the security if the data in the data cache can be insured. Meantime, said remote agent 155 is connected to the application function conversion section 153 and the application servicesupply section 154, so that the remote agent 155 is constituted so as to be able to communicate with the server computer without using the access section 151.

Figure 15:
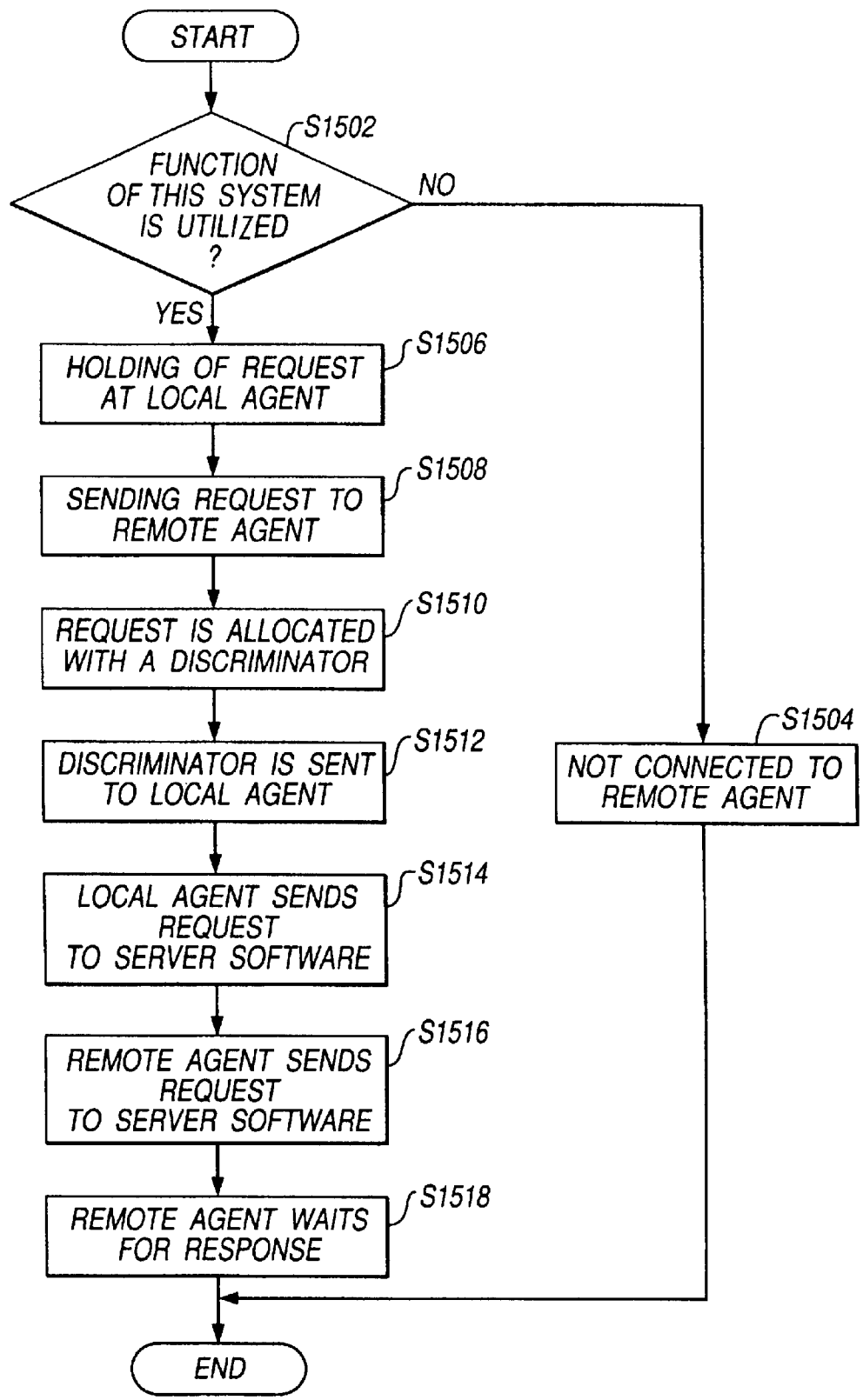
FIG. 15 is a flow chart, which shows a process of issuing a request according to the embodiment of the present invention.

The flow of the normal processing of the request issued by the client software 132, in case the function according to the embodiment of the present invention is used, is described by referring to FIG. 15.

First, whether or not said function shall be used, is judged by inquiring at the security section 152. Here, when said function is not used (NO of STEP S 1502), the local agent 131 is not connected to the remote agent 155, but is connected to the WWW-server directly (STEP S1504). Meantime, in this case, it is possible to cache the data according to necessity. Also, when the communication through a specified proxi is specified, it is, of course, possible to make a communication through a proxi server.

Next, when said function shall be used (YES of STEP S1502), the request from WWW-browser; is held at first at the local agent 131 (STEP S1506). Further, the local agent 131 transmits this request to the remote agent 155 (STEP S 1508). The remote agent 155 allocate a identifier to the request (STEP S1510), and this identifier is advised to thew local agent 131 (STEP S1512). The local agent 131 holds the request together with the identifier, after the local agent 131 is advised on the identifier. And then the local agent 131 enters into the condition that waits for a response to the request from WWW-server (STEP S1514). The remote agent 155 transmits the request from the local agent 131 to WWW-server Z(STEP S 1516) and enters into the condition that waits for a response to the request (STEP S1518).

Figure 16:
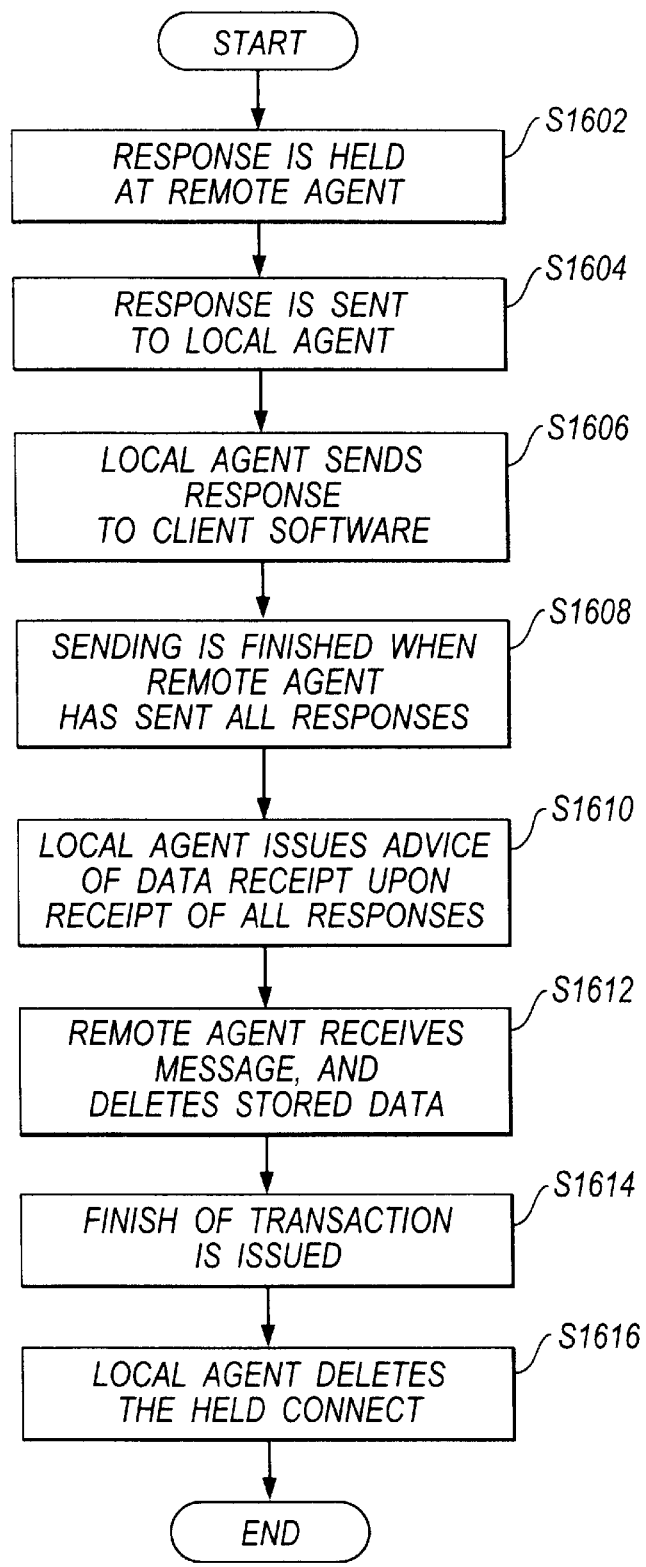
FIG. 16 is a flow chart, which shows a process of response reception according to the embodiment of the present invention.

The flow of the normal processing, when the response is made from the server software, is described by referring to FIG. 16.

When the remote agent obtains a response to the request from WWW-server, the remote agent holds the content of the response (STEP S1602). And then the result is conveyed to the local agent 131 (STEP S 1604). The local agent 131 transmits the result to WWW-browser; (STEP S1606). When the remote agent 155 transmitted all the communication data completely to the local agent 131, the remote agent 155 enters into a transmission finish condition (STEP S1608). When the local agent 131 completes the reception of the all the data from the remote agent 155, the local agent 131 advise the remote agent on the finish of reception (STEP S1610). Upon receipt of the message of reception finish from the local agent 131, the remote agent 155 deletes the request, the identifier and the processing result from WWW-server, which have been held (STEP S1612). And then, the remote agent advises the local agent 131 on the transaction finish. Upon receipt of the message of transaction finish, the local agent 131 deletes the request itself, the identifier for said request (STEPS 1616). In this way, the processing of the request from WWW-browser; is finished.

Now, the flow of the countermeasure for the circuit break-down by means of a series of processing is described.

When the transmission process becomes impossible due to a break-down of the communication circuit and the like during the transmission of the request from the local agent 131 to the remote agent 155, or during the transmission of the request identifier from the remote agent 155 to the local agent 131, a time-out processing is caused at the local agent 131 and the request for a repeat sending of the message is processed.

Also similarly, when the transmission process becomes impossible due to a break-down of the communication circuit and the like during the transmission of the message of reception finish from the local agent 131 to the remote agent 155, a time-out processing is caused at the local agent 131 and the conditions are recovered.

When the transmission of the processing result becomes impossible due to a break-down of the communication circuit and the like during the transmission of the processing result from the remote agent 155 to the local agent 131, a time-out processing is caused at the local agent 131 and the request for a repeat sending of the message is processed. However, as the time-put processing of this time is caused during the transmission of the processing result from the remote agent 131, the same effect and the leading position for the repeated transmission are conveyed to the remote agent 155. The remote agent 155 restarts the transmission of the processing result from the required position based upon these data. Also when the transmission of the processing result becomes impossible due to a break-down of the communication circuit and the like during the transmission of the message of transaction finish from the remote agent 155 to the local agent 131, a time-out processing is caused at the local agent 131 and the request for a repeat sending of the message is processed. However, when the deletion has been already completed at the remote agent 155, the remote agent 155 sends a message that the deletion of the processed result has been finished. Meantime, the actual circuit access is performed by the access section 151.

Figure 17:
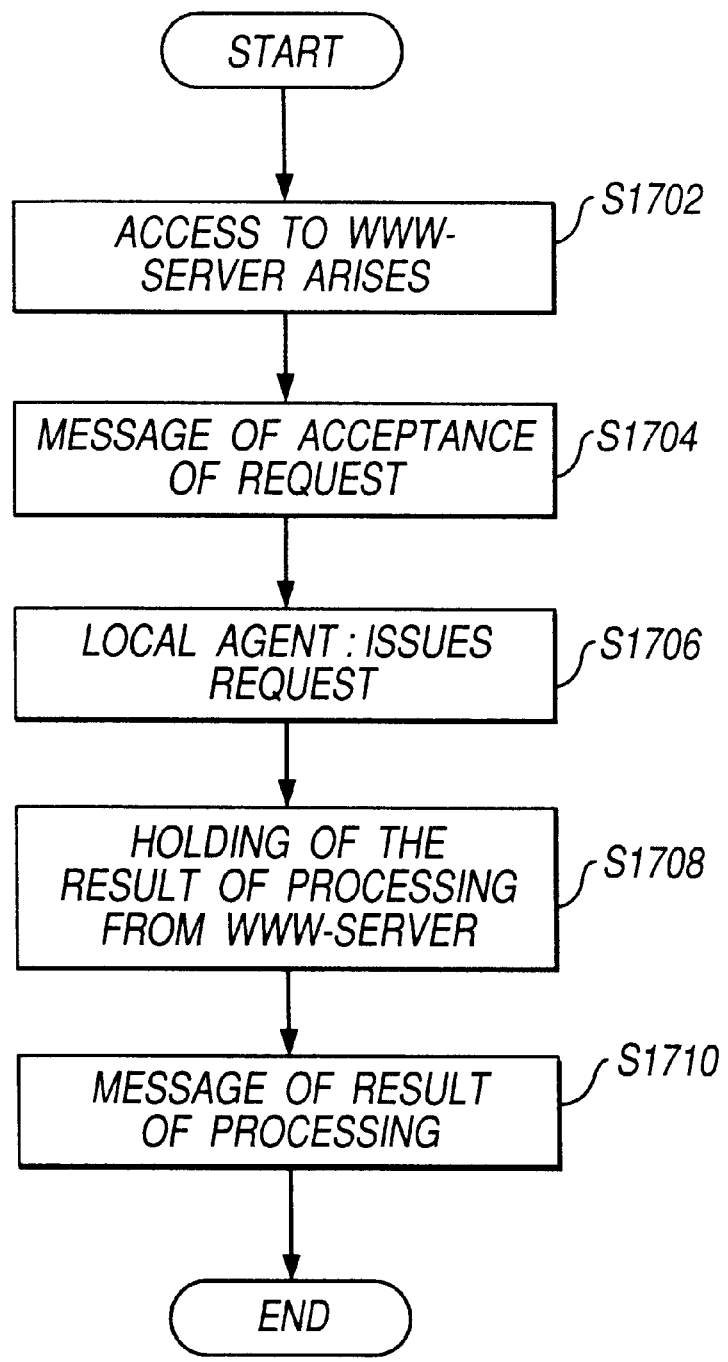
FIG. 17 is a flow chart, which shows an asynchronous access process according to the embodiment of the present invention.
Figure 18:
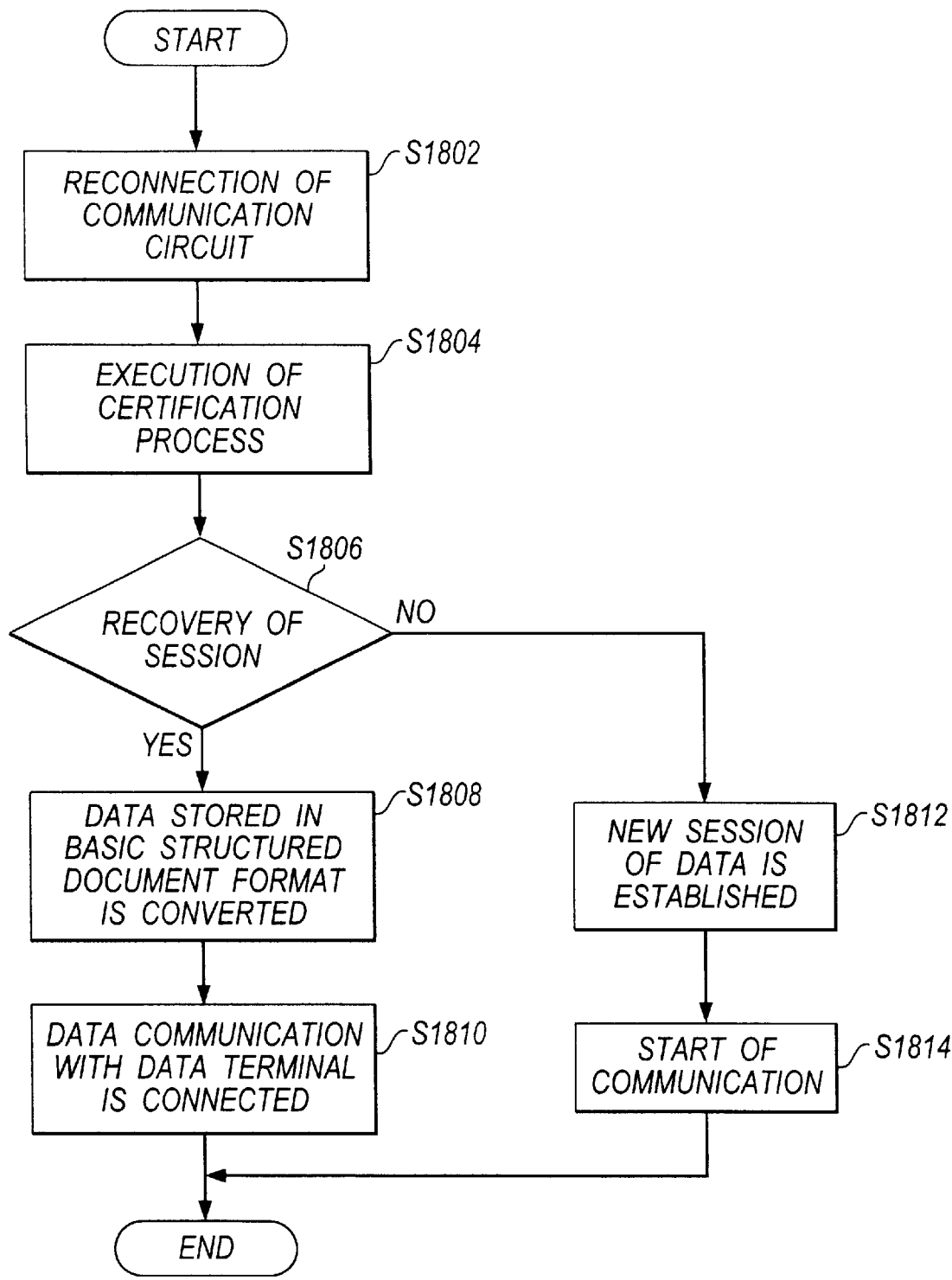
FIG. 18 is a flow chart, which shows a process for changing a terminal halfway of a communication according to the embodiment of the present invention.

Also it is also possible for the local agent 131 to provide WWW-browser; with an asynchronous access processing using the function according to the embodiment of the invention. In other words, a flow such as shown in FIG. 17 can be realized.

When an access to the WWW-server arises (STEP S1702), the local agent 131 transmits the information that the request is received, to WWW-browser; (STEP S1704). And then, the local agent 131 transmits the request from the WWW-browser; to the remote agent or WWW-server 'STEP S 1706). And then, while the result of the processing is held at the remote agent 155 (STEP S1708), the processed result is transmitted to the WWW-browser;, when the access is repeated by the WWW-browser; (STEP S 1710). By providing such an arrangement, a processing, which requires a long time, can be executed asynchronously together with WWW-browser;. Meanwhile, when the result of processing is accessed by WWW-server before the processing is finished at the server computer, the local agent 131 informs WWW-browser; that the processing is under way.

Meanwhile, it has been already explained that an asynchronous processing can be realized using the arrangement for the session (connection) control of the present invention at the time of break-down as explained in the above. If the arrangement of session (connection) control is used, when the communication circuit with the data processing terminals is broken down, and when the user utilizes the application function repeatedly, he can utilize a different kind of data processing terminals.

The flow of this processing is described by referring to FIG .18. In other words, when the user tries the access again (STEP S1802), a verification processing is performed at the security section 152 (STEP S 1804) and the session (connection) of the user can be recovered based upon said result (YES of the STEP S 1806). Thereafter, the basic structured document format held based upon the session (connection) data is converted into the format suitable for the terminals utilized at present (STEP S1808) and the communication is executed with the data processing terminals (STEP S1810). In this way, the user can change the terminals halfway during the processing. Meanwhile, in the case of the actual installation, whether or not session (connection) shall be recovered, can be left to option of the user at the circuit connection.

On the other hand, in the case that the session is not recovered (NO of STEP S1806), a session information is newly established (STEP S1812) and the communication is started (STEP S 18124).

Meanwhile, the method described in the above can be applied to various apparatuses, by writing in semiconductor memory such as floppy discs mounted in FDD 18, optical disc devices such as HDD 20, CD-ROM device 21 and DVD etc., or by transmitting the method through communication media to apply the same to various apparatus. The computer (server computer), which can realize this apparatus, is to read out the programmed data stored in memories media and executes the above processing by being controlled by the programmed data.

Also it is, of course, possible to perform the various processing which are described at the first embodiment, even in this embodiment.

(Third Embodiment)

Figure 19:
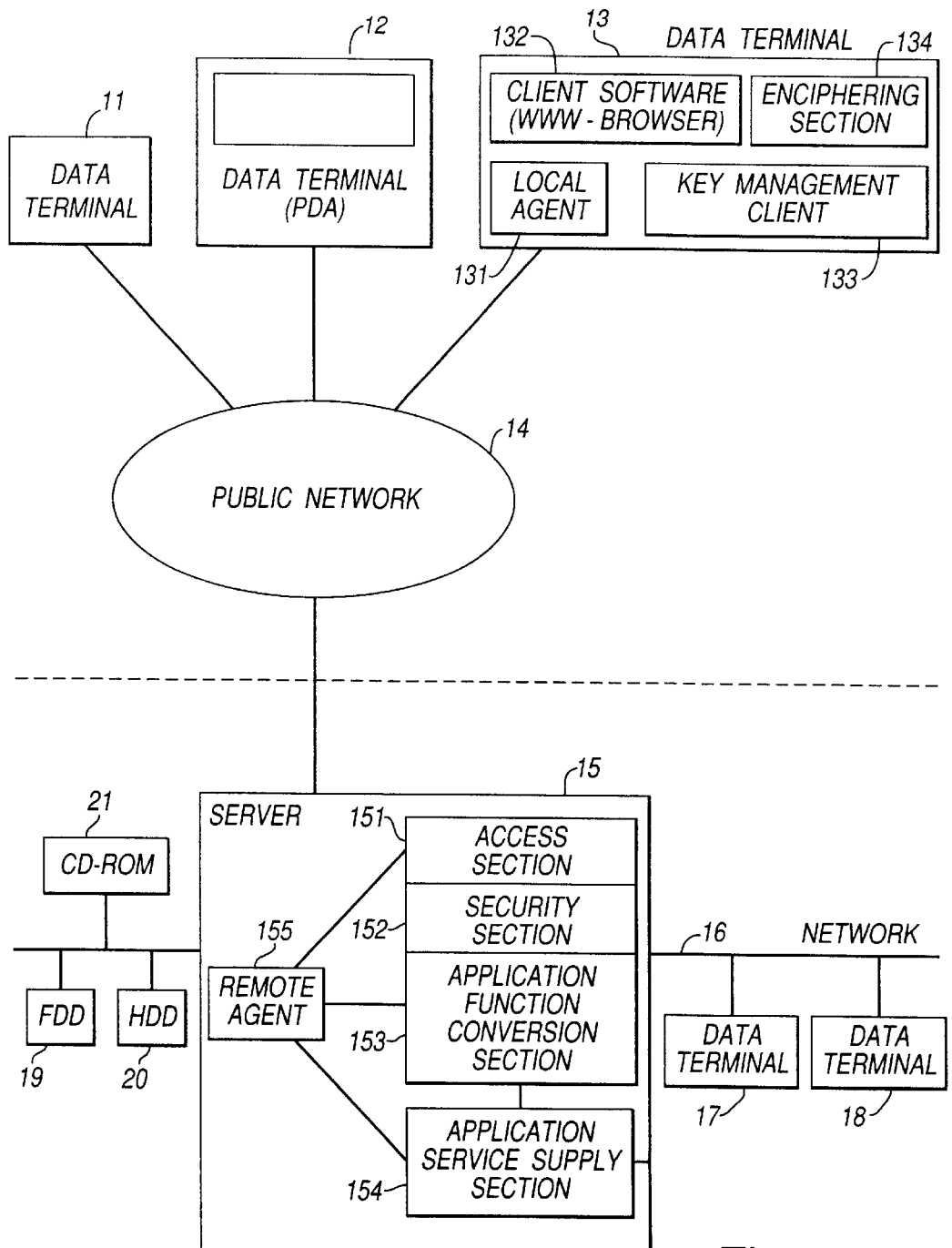
FIG. 19 is a block diagram, which shows the concept of the network computing system according to the third embodiment of the present invention.

Hereinafter the third embodiment of the present invention is described. Identical or corresponding parts or functions as shown in the first embodiment are designated by like reference numerals and the explanations therefor are eliminated. FIG. 19 is a drawing which shows concept of the constitution of the network computing system including the idea of enciphering system for data cache.

For example, if the data cache of WWW-browser; is wrongly accessed, when a user is utilizing WWW-browser;, the data may leak out. Therefore the enciphering of the data cache becomes necessary.

As already explained, the security section 152 is equipped with a function that executes verification of users, a management function for the enciphering processing and keys in regard to enciphering (key management server function) etc. Also, the local agent 131 includes a data cache. for example, when the user execute a work by utilizing WWW-browser;, an efficient processing can be executed even if he does not utilizes the function for data cache. In this connection, by storing data in the data cache within this local agent 131, the security of data cache can be insured. Furthermore, in FIG. 19, it is shown that the data terminals 13 is equipped with a client function for key management (Key management client 133. This is to execute a processing on the side of key clients for enciphering and deciphering. And, enciphering section 134 is a section which execute enciphering and deciphering actually. Meantime in the actual installation, these functions may be installed in the local agent 131.

Figure 20:
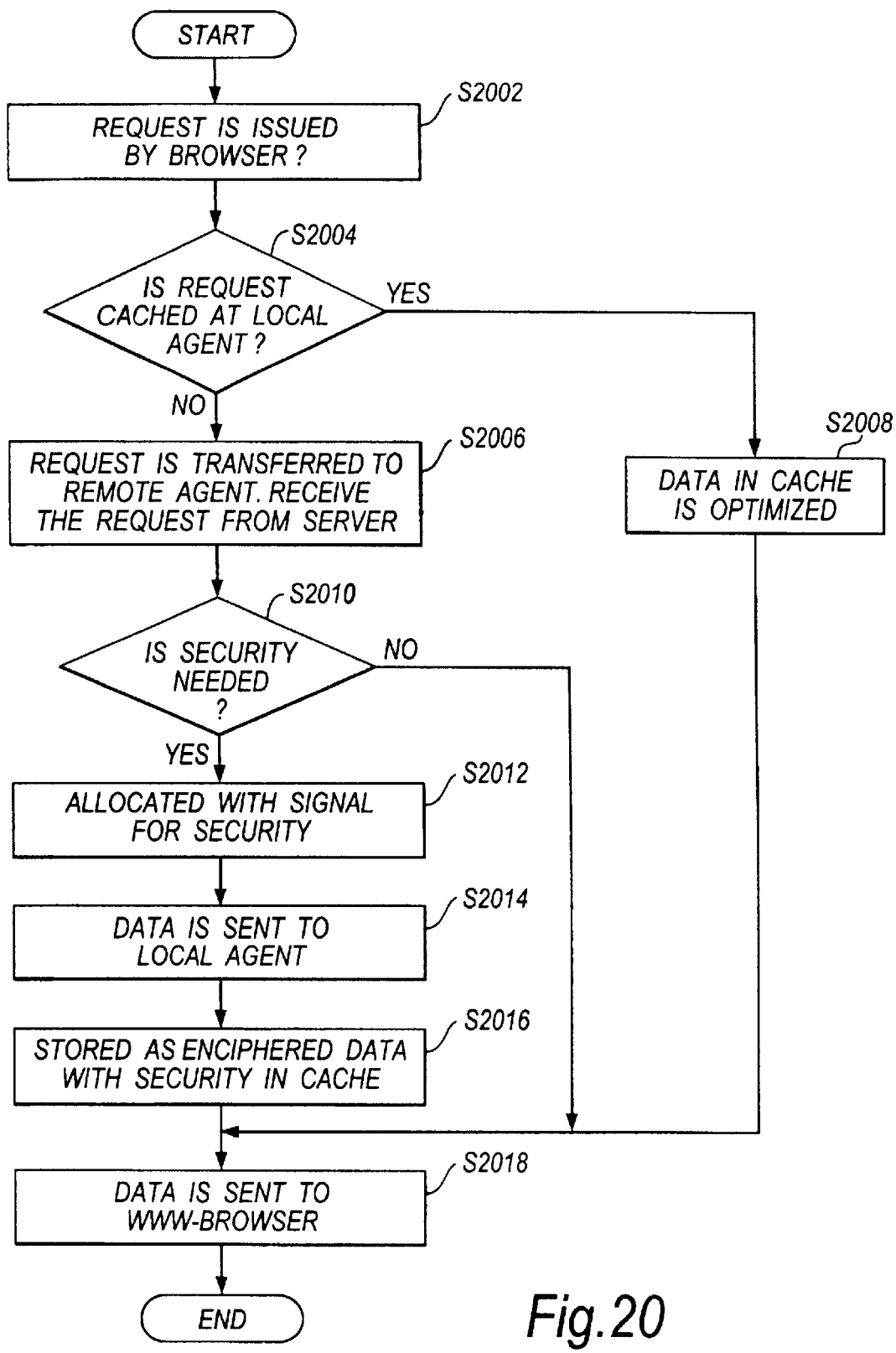
FIG. 20 is a flow chart, which shows a data cache processing according to the embodiment of the present invention.

Here, the flow of data cache of the local agent 131 and the remote agent 155 is described by referring to FIG.20. Here, the case that the user utilizes WWW-browser; is explained and the flow of the cooperation between the agents, and the enciphering processing is explained later by referring to FIG. 21.

As explained already, when the function of the present invention shall be used when a user is going to access to the WWW-server in the server from WWW-browser; in the terminals, the data passes through the local agent 131 and the remote agent 155. And the data cache in WWW browser; is not utilized.

At first, when a request arises from WWW-browser;, which a user utilizes (STEP S 2002), it is judged, whether or not the data to be accessed exist in the data cache of the local agent 131 (STEP S2004). If the data does no exist (NO of STEP S2004), the request from WWW-browser; is transferred to the remote agent 155, and the result is obtained from the server (STEP S2006). In case that the data exist in the data cache (YES of STEP S2004), the content of the data in the data cache is made to a up-to-data condition and given to WWW-browser;(STEP S2008). Meantime, at this time, whether the data in the data cache is in a up-to-date condition, is judged by linkage with the server. If the data in the data cache is confirmed as up-to-date, the data in the data cache, as they are, are naturally transferred to WWW-browser;.

If the remote agent 155 procures the relevant data from WWW-server, it is judged, whether said data is the data that security shall be insured (STEP S 2020). At this moment, the judgement as to whether security shall be insured for said data, can be made based upon the reasons for the judgement, which are stored as head data. Meantime, of course, the judgement can be made based upon said data while the content of the data are interpreted directly.

Further, when the security is required (YES of STEP S2010), a signal of said effect is added to the data (STEP S 2014) and said data are transmitted to the local agent 131 (STEP S2014). The local agent 131 transmits the data to WWW-browser; (STEP S 2018), after storing the enciphered data in the cache (STEP S 2016).

Figure 21:
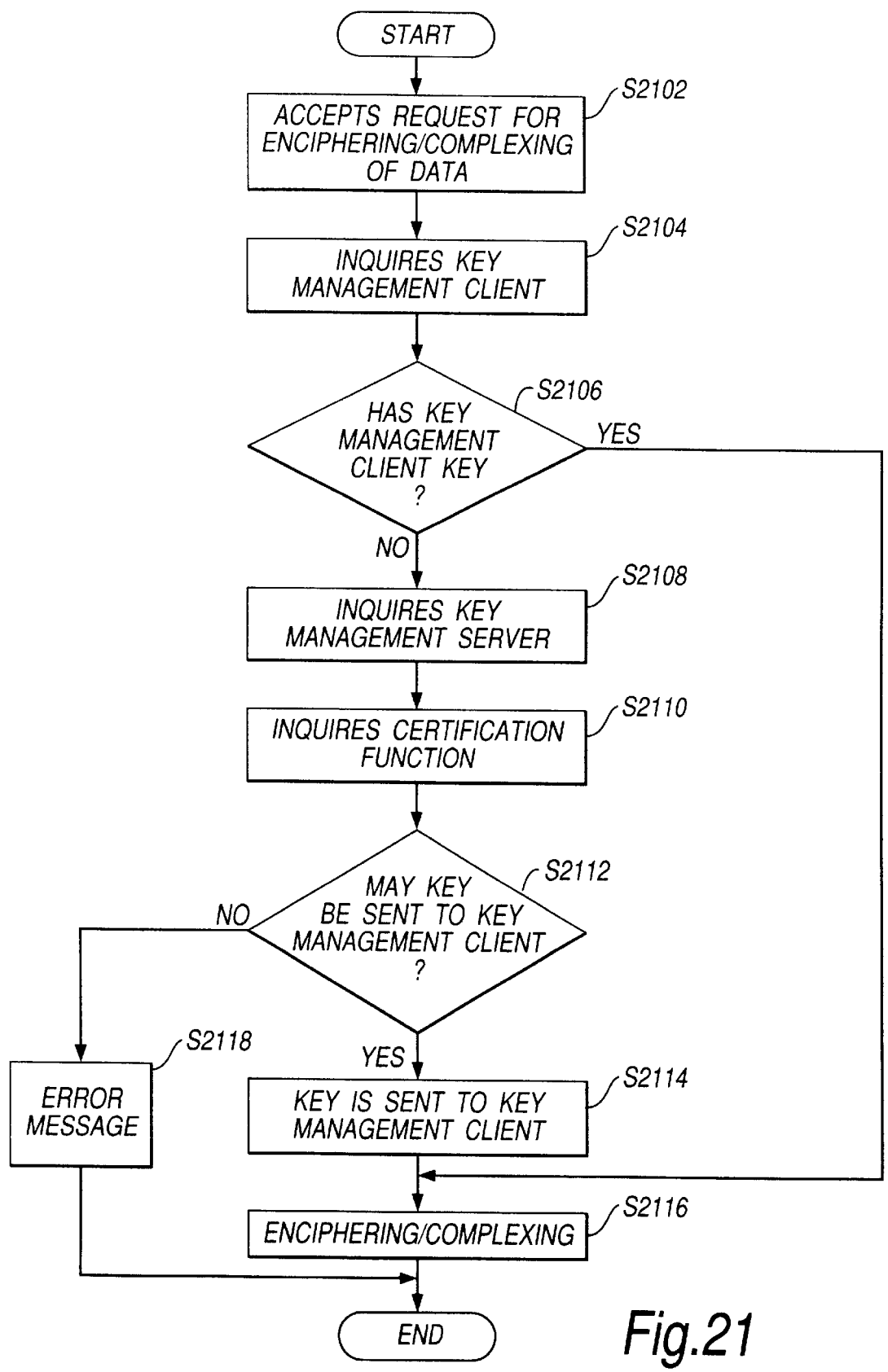
FIG. 21 is a flow chart, which shows a data enciphering and a complex processing according to the embodiment of the present invention.

Next, the flow of the enciphering and deciphering process is described by referring to FIG. 21. the processing of the enciphering and deciphering at the client terminals is caused when the storing and call-up for the data cache arises. In this case at first, the enciphering section 134 requests a delivery of the key for the enciphering (STEP S 2102, S2104. Here, when the key management client 133 has the key (YES of STEPS 2116), the enciphering or deciphering is executed based upon this key (STEPS 2116).

On the other hand, in case that the key management client 133 does not have the key (NO of STEPS 2116), the key management client 133 requests the key management server for a delivery of the key (STEP S 2108).

The key management server, which has received the request, inquires the verification function of the security section 152 (STEP S2110) and judges, whether or not the key shall be delivered (STEP S 2112). If the request is judged right (YES of STEP S 2112), the key management server delivers the key to the key management client 133 (STEP S2114) and enciphering and deciphering can be executed based upon said key (STEPS 2116). Meantime, enciphering and deciphering are executed, when storing and call-up of data into the cache in the terminals, however, in the actual execution, enciphering and deciphering may start from the stage of sending/receiving of the data between the client agent and the server agent. Also, though the case that the key server and security section exist in the server, has been described, all these functions may be, of course, installed in the terminals for enabling the client to execute the process independently.

In the meantime, a enciphering arrangement for local data, which can access to the data in the terminals itself only when it is connected to the network, can be realized, at the data terminals, which can store data in the terminals itself such as PC, by utilizing said security arrangement.

Figure 22:
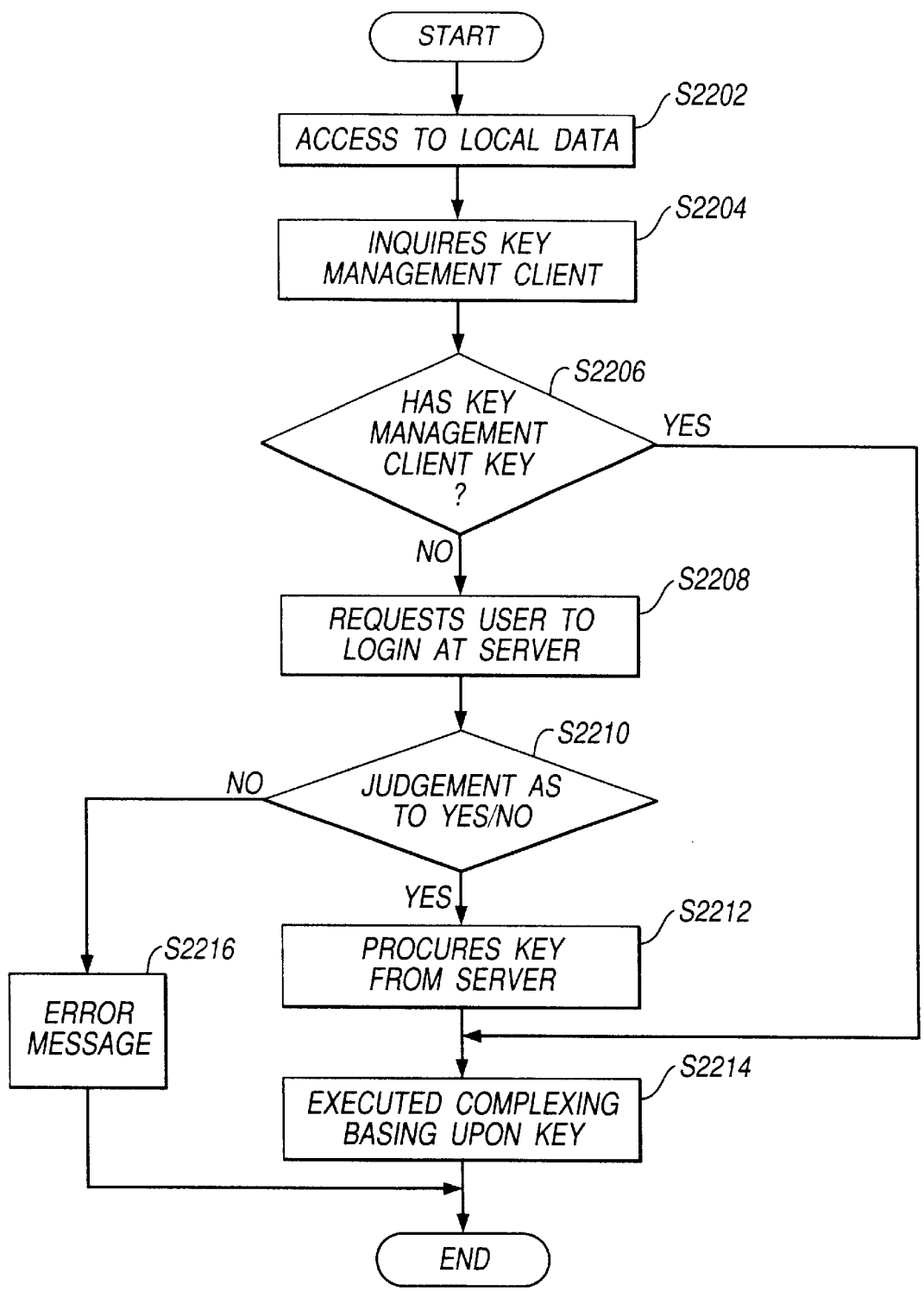
FIG. 22 is a flow chart, which shows a processing by an enciphering system for local data according to the embodiment of the present invention.

Successively, the processing of the deciphering arrangement for the local data is described by referring to FIG. 22.

At first, when the user is going to connect to the server from the data terminals and when the verification processing has been completed by the security section 152, the key management server delivers the key to be used for enciphering/deciphering to the key management client 133. And then, in case that the user is going to access to the data file (STEPS 2202), the enciphering section 134 reads out said instruction and makes an inquiry at the key management client 133 (STEP S2204). Upon this inquiry, the key management client 133 informs enciphering section 134 of said key and the deciphering is made based upon said key (STEP S2214). In this connection, that the key management client has the key, mean that the user of the terminals has already made a login in the server.

On the other hand, when the key management client 133 does not have the key (NO of STEP S2206), the user is suggested to make login at the server (STEP S2208). Here, when the login is not performed, or, when the login is not finished rightly (No of STEPS 2210), the access processing to the data is handled as an error (STEP S2216). If the login process has been executed normally (YES of STEP S2210), the key management client receives the key from the key management server and the deciphering process is executed using said key (STEPS 2214). Meanwhile, as to the enciphering process, the enciphering process is executed, when the instruction for the write-in is issued, contrary to the above. It is also naturally possible to provide the automatic processing for writing in and to execute enciphering and deciphering clearly.

In the meantime, even after the login condition for the server computer is released, it is possible to maintain said condition for a certain time as to the key management. By realizing such a processing, it becomes possible to access to the local data for a certain time even at an incidental circuit break-down.

Meanwhile, the method described in the above can be applied to various apparatuses, by writing in semiconductor memory such as floppy discs mounted in FDD 18, optical disc devices such as HDD 20, CD-ROM device 21 and DVD etc., or by transmitting the method through communication media to apply the same to various apparatuses. The computer (server computer), which can realize this apparatus, is to read out the programmed data stored in memories media and executes the above processing by being controlled (under control) by the programmed data.

Also it is, of course, possible to perform the various processing which are described at the first and second embodiments, even in this embodiment.

(Fourth Embodiment)

Hereinafter, the fourth embodiment of the present invention is described. Identical or corresponding parts or functions as shown in the first embodiment are designated by like reference numerals and the explanation therefor is eliminated.

The security section 152, which is described in the above is described.

In the data exchange system, which is described in the present invention, a discrimination function, which discriminates and manage the users, is important. Especially, in the distributed network computing system, wherein the various portable terminals are used, as in the case of this system, key input systems of the respective portable data terminals are not same. In other words, there are different keys, keys which input is easy and keys which input is difficult. for example, in case that a portable PC is used as a portable data terminals, the input of English letters and numerals is easy. However, in the case that apparatus such as a portable phone such as so-called smart-phone is used as the terminals, keyboard can not be used generally as in the case of aforementioned PC, and the buttons for inputting the number only can be used as the input keys. Accordingly, in the case of the login name used for the discrimination of the user (account name) and when the letters other than the numerals are used for the pass word, the input is easy at a portable PC, however, in case of a portable phone such as smart phone, input is complicate. Also, in a distributed network computing system such as this system, it cannot be denied that the same login name is used by a plurality of the users. Accordingly, in case of the verification, such a situation should be coped with.

As already described in the above, the security section 152 is provided with a verification processing section 1521, a code processing section 1522 and a personal data management section 1523.

In what structure of data the personal data are managed corresponding to the login names of the users, In the personal data management section 1523, the competence of the login against the main server system. attribute items and the attribute value are stored. In this connection, the attribute value are the data regarding the services items, which respective application functions are to supply, such as login name, competence, pass word for the purpose of application function, when the application functions, namely, various application software of the application servicesupply section 154 are utilized. Meantime, for the security purpose, these personal data are enciphered in the actual execution and are operated by a tool of exclusive use. The table 1 in FIG. 23 shows the idea of management items in the form of table.

At the discrimination processing section 1521, not only the actual verification processing is performed but also the relations between the identifiers, which are issued in connection with respective logins and which have been already mentioned, and the login names are managed. This correspondence is renewed every time, when login and logout of each user is processed. The table 2 of FIG. 24 shows an idea of the relation between the login names and the identifiers. In this connection, even when a login is processed with the same logon name to the server system of the present invention, different identifiers are issued. Meanwhile, Table 2 show just an idea of the correspondence, and it is not necessary to use a form of determinant as shown in the table at the actual management.

The user of this server system may receive a supply of the services from the application servicesupply section 154 through this system. For this purpose, at first the user must be discriminated as a justified user by means of the discrimination function. When the discrimination processing is finished and the login is completed, the respective application functions may be accessed according to the necessity.

Next, the flow of the processing when the server system of the present invention received a request for a verification, is described hereinafter.

It is judged, whether or not the data of the user, which are presented by the user of the terminals coincides with the data, which the server system of the present invention manages as the justified user. Here when the verification is processed, then a identifier is issued, as already explained. This identifier and the login name are advised also to the application function conversion section 153. In this connection, if the user requests a login through the server system to the application functions (application software of the application servicesupply section 154), an inquiry on the personal data together with the data of the user, who issued the request, such as the login name, pass word, verification identifier is executed by the application function conversion section 153 to the security section 152.

The personal data which are managed at the security section 152, involve also the login name and the pass word of the user, which are used at the application function. When the login name and verification data such as a identifier are judged right, the security section 152 supplies the application function conversion section 153 with the personal data corresponding to the application functions.

As the application function conversion section 153 supplies the application functions with the personal data, when the user once executes login at the server system of the invention, a renewed login is no more necessary, when he utilizes the application functions.

Figure 25:
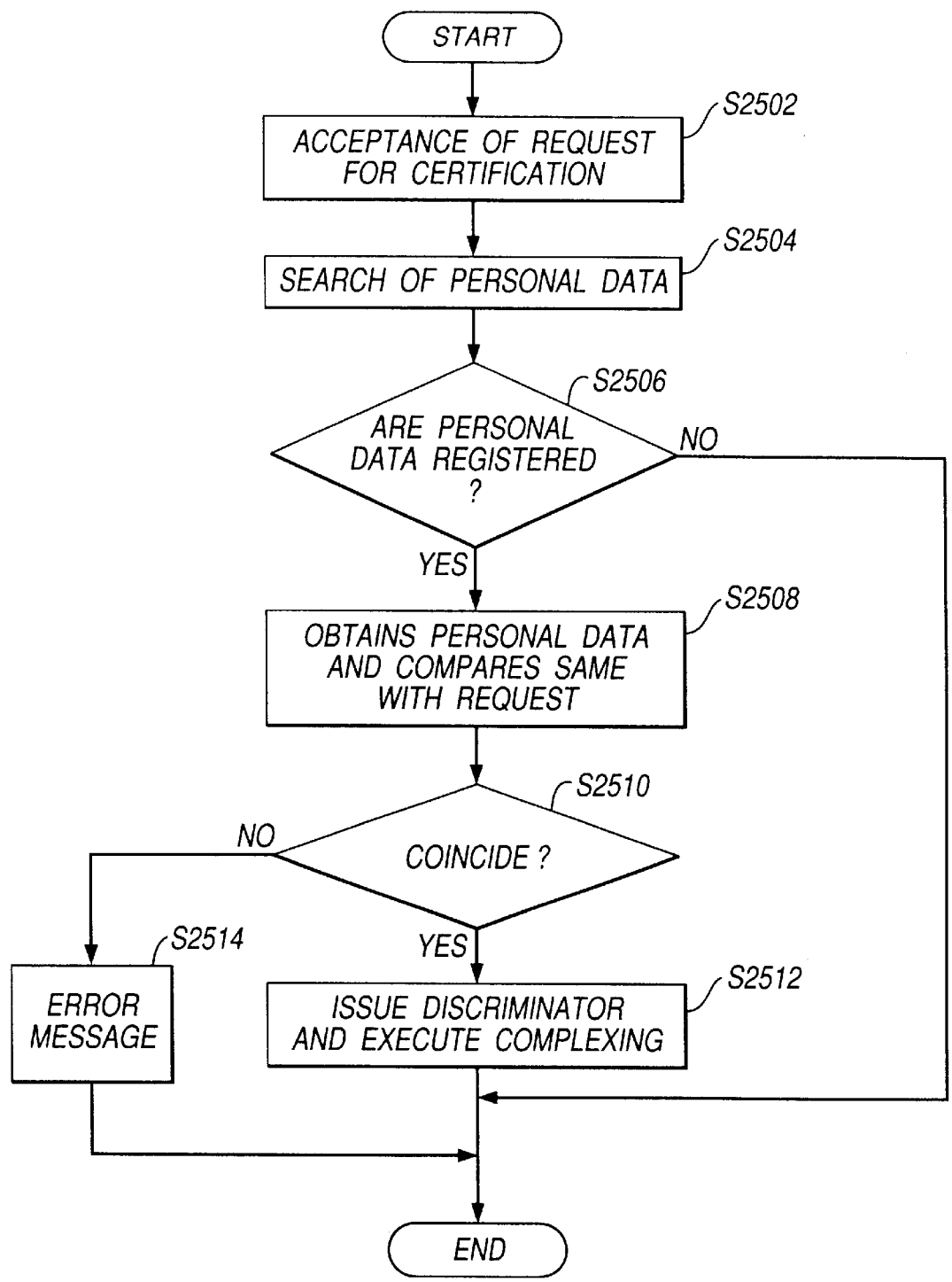
FIG. 25 is a drawing, which shows the verification process according to the embodiment of the present invention.
Figure 26:
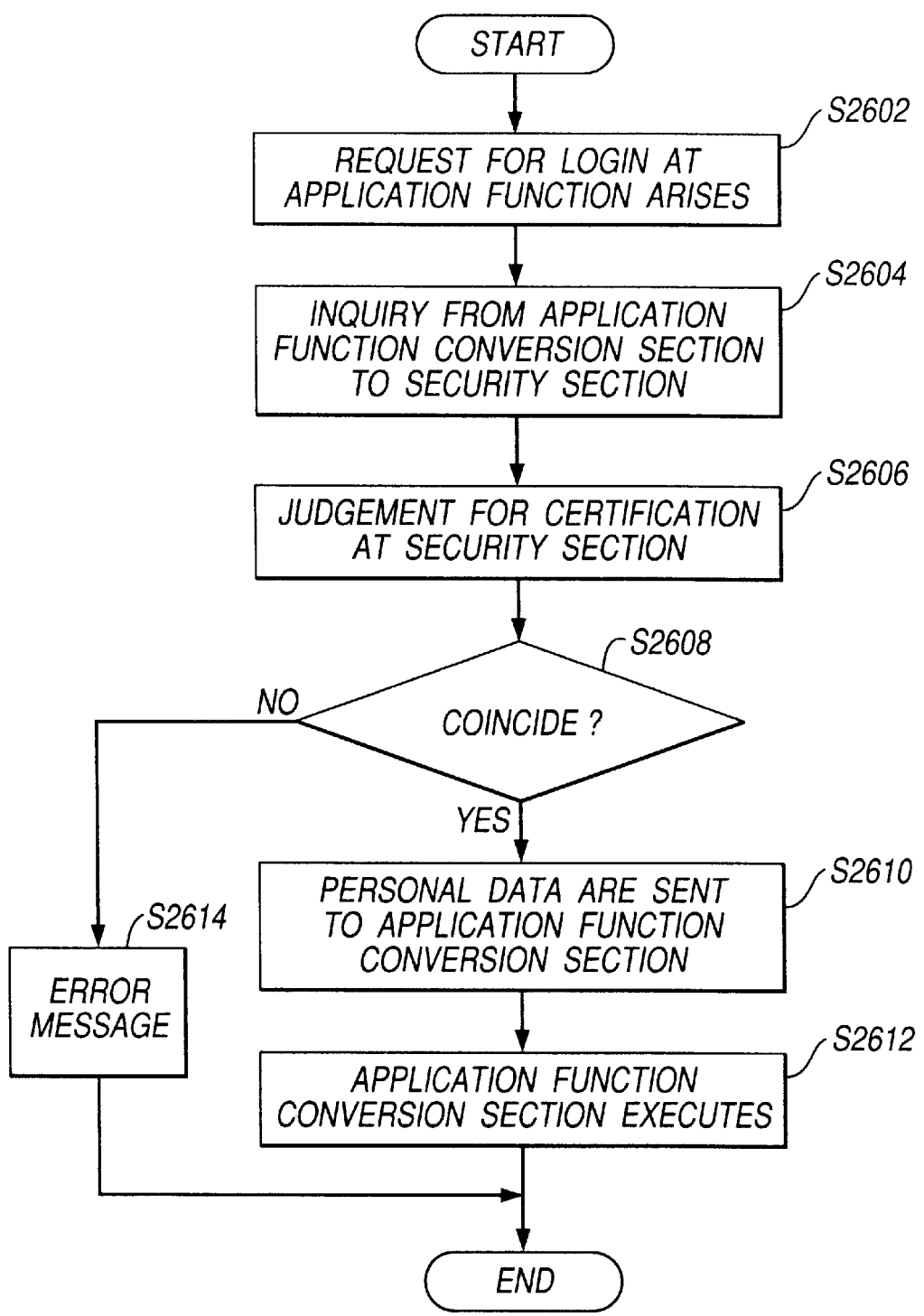
FIG. 26 is a flow chart, which shows vicarious execution of login process according to the embodiment of the present invention.

The flow of the processing, when the server system of the invention receives a request for a verification, is described in detail by referring to FIG. 25, which shows a flow chart of verification processing, and FIG. 26 which shows the flow chart of vicarious processing of login.

When a request for verification (user's data including login name, pass word and terminals data) is received (FIG. 25, STEP S 2502), personal data, which are managed at the security section 152 are searched (STEP S 2504) and it is judged whether or not said personal data are already registered (STEP S2506). If said personal data are already registered (YES of STEP S2506), the personal data is obtained (STEP S 2508) and is compared with the data received from the terminals (STEP S 2510). If both data coincide each other by the comparison (YES of STEPS 2510), a identifier is issued (STEP S 2512). In case that these do not coincide each other, it is processed as an error (STEP S2514). Meantime, at the step S2506,when the personal data are not registered (NO of STEPS2506), the processing finishes. Meantime, the enciphered data are made complex according to the necessity.

When the verification processing is performed in such a way and a identifier is issued, the user is enabled to make a request for the use of the application functions (the application software at the application servicesupply section 154). In this connection, when the user makes a request for the use of the application functions, it is necessary for him to make a login at the application functions. When the user makes a request for the login at the application functions (FIG. 26, STEP S 2602), the personal data corresponding to the application functions is inquired by the application functions conversion section 153 at the security section (STEP S 2604) and the verification is judged by the security section 152 (STEP S 2606, S 2608).

When the verification coincides with (YES of STEP S2608), the personal Data are transferred tp the application function conversion section 153 (STEP S 2610). Based upon this information, the application function conversion section 153 performs a vicarious processing of login at the application functions (STEP S 2612).

On the other hand the verification does not coincide with (NO of STEP S 2608), the same is processed as an error and the process finishes.

As described in the above, as the application function conversion section 153 provides the application function with the personal data, if the user makes a login once, it is no more necessary to newly to make a login when he utilizes the application function. according to the embodiment of the present invention.

Also, even with the constitution of this embodiment, various processing as described at the aforementioned first, second and third embodiments can be, of course, operated and performed.

Meantime, the aforementioned method as programmed data which can be executed by a computer, of course, can be applied to various kinds of apparatuses, and can be conveyed through communication media to to various kinds of apparatuses for application, by writing in semiconductors memories, for example, floppy disks to be equipped in FDD 19, optical memory disk devices such as FDD, CD-ROM and DVD. The computers (server computers), which can realize these apparatuses, are to execute the aforementioned processing by reading out the programmed data stored in the memory media and by being operated by said programmed data.

As described in the above, according to the present invention, even in the mobile computing environment, the work equivalent to the work in the office can be performed successively, In other words, the services which are suitable to the processing capacity of the various kinds of terminals, can be supplied, and furthermore, even in case that a plurality of communication infrastructure coexisted, the service suitable for the infrastructure can be supplied. Furthermore, an excellent effect, that the security function can be improved, is expected.

Furthermore, according to the present invention, the communication break-down that the communication is broken down halfway, can be properly coped with. In addition, even in case of the data processing work, which requires a long time, the terminals can be effectively utilized and also a excellent practical benefit that the communication charge can be saved economically, can be brought.

Also according to the present invention, the login function can be improved (vicarious login function: single sign on function) and also the operability can be improved extensively.

What is claimed is:

1. A distributed network computing system comprising; a server computer, which supplies an application service;
various kinds of terminals that request access to the application services, which receive the application services from said server computer; and
a communication network, which connects said server computer with said terminals;
said server computer further including a data exchange apparatus including:
an access control means which controls the connection of said terminals with said server computer,
a security control means which judges verification of said terminals connected by said access control means, and
a contents converting means, which converts the services contents of the application services to be supplied to said terminals judged by said security control means into a format suitable for each of said terminals.

2. A distributed network computing system comprising:
a server computer, which supplies an application server;
various kinds of terminals that request access to the application services, which receive the application services from said server computer; and
a communication network, which connects said server computer with said terminals;
said server computer further including a data exchange apparatus including:
an access control means which controls the connection of said terminals with said server computer,
a security control means which judges verification of said terminals connected by said access control means,
a contents converting means, which converts a services contents of the application services to be supplied to said terminals judged by said security control means into a format suitable for each of said terminals; and
a connection control means, which controls the connecting condition of said terminals with said server computer and controls to supply the services contents of the data converted by said contents converting means based upon said connecting condition.

3. A distributed network computing system comprising:
a server computer, which supplies an application service;
various kinds of terminals that requesting access to the application services, which receive the application services from said server computer; and
a communication network, which connects said server computer with said terminals;
said server computer including a data exchange apparatus including:
an access control means which controls the connection from said terminals;
a security control means which judges verification of said terminals connected by said access control means,
a contents converting means, which converts a services contents of the application services to be supplied to said terminals judged by said security control means into a format suitable for each of said terminals,
a connection control means, which controls the connecting condition of said terminals with said server computer and controls to supply the services contents of the data converted by said contents converting means based upon said connecting condition, and
a control means for controlling said terminals so that said terminals are enabled to decipher specific data, when said terminals is in conjunction with said data exchange apparatus through a network and made a request for an access to the specific data by meeting the specified conditions.

4. A distributed network computing system comprising:
a server computer, which supplies an application service;
various kinds of terminals that request access to the application services, which receive the application services from said server computer; and
a communication network, which connects said server computer with said terminals;
said server computer further including a data exchange apparatus including:
an access control means which controls the connection of said terminals with said server computer,
a security control means which judges verification of said terminals connected by said access control means, a contents converting means, which converts a services contents of the application services to be supplied to said terminals judged by said security control means into a format suitable for each of said terminals, a connection control means, which controls the connection condition of said terminals with said server computer and controls to supply the services contents of the data converted by said contents converting means based upon said connecting condition, a first control means for controlling said terminals so that said terminals are enabled to decipher specific data, and a second control means that executes a verification process by means of a proper system and controls a login process suitable for the terminals, when said terminals are in connection with said data exchange apparatus through the communication network and made a request for an access to the specific data by meeting specified conditions.

5. A distributed network computing system as claimed in claim 1, 2, 3, or 4 wherein said security control means, said access control means and said contents converting means are provided with a unified view regarding the terminals, which is accessing, by issuing a new identifier by said security control means.

6. A distributed network computing system as claimed in claim 1,2,3, or 4 wherein said contents converting means is provided with a means to convert the data into the format suitable for said terminals based upon a communication system used by said terminals.

7. A distributed network computing system as claimed in claims 2,3, or 4 wherein said connection control means is provided with a means to enable data transmission to continue from an interrupted point at the time of a breakdown of the circuit, based upon a record of the data conversion by said contents converting means and a record of the connecting condition with said terminals.

8. A distributed network computing system as claimed is claim 3 or 4 wherein said data exchange apparatus is provided with a remote agent function executing means, while at least one of the various kinds of terminals is provided with a local agent function as a client, and said data exchange apparatus and said terminals are provided with a means to execute a data cache function.

9. A distributed network computing system as claimed in claim 3 or 4 wherein said data exchange apparatus is provided with an executing means for a remote agent function as a server, while at least one of the various kinds of terminals is provided with a local agent function as a client, and said data exchange apparatus and said terminals are enabled to execute a function of data exchange processing without giving any change in a relation of server/client.

10. A distributed network computing system as claimed in claim 3 or 4 wherein said access control mean is able to procure data regarding a communication record or log data.

11. A system for a distributed network computing system for providing application services, comprising:

an access control means which controls a connection process from one or more terminals requesting access to the application services which exist in a network and receive a supply of application services, a security control means which judges a verification of said terminals connected by the access control means; and a contents converting means which converts contents of the application services into a format suitable for the terminals judged by data from the security control means.

12. A system for a distributed network computing system for providing application services, comprising:

an access control means which controls a connection process from terminals requesting an access which exist in a network and receive a supply of application services, a security control means which judges a verification of said terminals connected by the access control means;

a contents converting means which converts the content of the application services into a format suitable for each of the terminals judged by data from the security control means; and a connection control means which controls a connecting condition of the terminals so as to supply services contents converted by said contents converting means based upon said connecting condition.

13. A system for a distributed network computing system for providing application services, comprising:

an access control means which controls a connection process from terminals requesting access to the application services which exist in a network and receive a supply of application services, a security control means which judges verification of said terminals connected by the access control means, a contents converting means which converts the content of the application services into a format suitable for each of the terminals judged by data from the security control means, a connection control means which controls a connecting condition with the terminals so as to supply the services contents converted by said contents converting means based upon said connecting condition; and a control means to enable the terminals to decipher specified data when said terminals lie in a connection through said network and said terminals make a request for an access to a specific data by meeting specified conditions.

14. A system for a distributed network computing system for providing application services, comprising:

an access control means which controls a connection process from terminals requesting an access which exists in a network and receive a supply of application services, a security control means which judges the verification of said terminals connected by the access control means;

a contents converting means which converts the content of the application services into a format suitable for each of the terminals judged by data from the security control means;

a connection control means which controls a connecting condition with the terminals so as to supply service contents converted by said contents converting means based upon said connecting condition, a control means to enable the terminals to decipher data regarding a specific data, a control means to execute a verification process by means of a proper system and to execute login suitable for the terminals by means of a proper method based upon a result of the verification when said terminals lie in a connection through said network and make a request for an access to a specific data by meeting the specified conditions.

15. A system for a distributed network computing system as claimed in claim 11, 12, 13, 14, wherein said security control means, said access control means and said contents converting means are provided with a unified view regarding the terminals, which is accessing by issuing a new identifier by said security control means.

16. A system for a distributed network computing system as claimed in claim 11, 12, 13, 14, wherein said contents converting means is provided with a means to convert the data into the format suitable for said terminals depending upon a communication system used by said terminals.

17. A system for a distributed network computing system as claimed in claim 11, 12, 13, 14, wherein at least one of the terminals is provided with a local agent function and a remote agent function means which enable data cache function with said terminals.

18. A system for a distributed network computing system as claimed in claim 13 or 14 wherein said system is provided with a remote agent function execution means and that one of said various terminals is provided with a local agent function as a client, so that data exchange processing function is enabled without changing the cooperation relation between said system and said terminals as the server and the client.

19. A system for a distributed network computing system as claimed is claim 13 or 14 wherein said access control means enables procuring communication record data or log data.

20. A method for a distributed network computing system for providing applications services wherein a server computer which provides application services, and various kinds of terminals requesting an access which receive application services from said server computer are connected to each other by networks, comprising the steps of:

controlling a connection process from said terminals, judging verification of the terminals connected and contents of the application services to be supplied to said terminals so that they are converted into a format suitable for each of the terminals.

21. A method for a distributed network computing system for providing application services wherein a server computer which provides application services and various kinds of terminals requesting access to the applications services which receive application services from said server computer are connected to each other by networks, comprising the step of;

controlling a connection process from said terminals, judging verification of the terminals connected, converting a content of the application services to be supplied to said terminals into a format suitable for each of the terminals; and controlling a connecting condition with said terminal, such that the converted services are supplied to the terminals based upon said connecting condition.

22. A method for a distributed network computing system for providing applications services wherein a server computer which provides application services, and various kinds of terminals requesting an access which receive application services from said data processing apparatus are connected to each other by networks, comprising the steps of:

controlling a connection process from said terminals, judging verification of the connected terminals, converting the contents of the applications services to be supplied to said terminals into a format suitable for each of the terminals, controlling a connecting condition with said terminals such that the converted services contents are supplied to the terminals based upon said connecting condition, controlling said terminals to decipher specified data, when said terminals lie in a connection through the network and said terminal makes a request for access to a specified data by meeting a specified condition.

23. A memory media readable by a computer, in which program data for a method for a distributed network computing system for providing application services are stored, comprising the step of:

controlling a connection process from terminals requesting access to the application services connected to said network and judging verification of the terminals connected and controlling contents of the application services to be supplied to said terminals so as to convert contents of the application services into a format suitable for each of the terminals.

24. A memory media readable by a computer, in which program data for a method for a distributed network computing system for providing application services are stored, comprising the step of, controlling a connection process from terminals requesting access to the application services connected to said network, judging verification of the terminals connected, converting contents of the application services to be supplied to said terminals into a format suitable for each of the terminals, and controlling a connecting condition with said terminals so that the converted services contents of the data are supplied to the terminals based upon said connecting condition.

25. A memory media readable by a computer, in which program data for a method for a distributed network computing system for providing application services are stored, comprising the step of;

controlling a connection process from terminals requesting access to the application services connected to said network, judging verification of the terminals connected, converting content of the application services to be supplied to said terminals into a format suitable for each of the terminals, controlling a connecting condition with said terminals so that the converted services contents of the data are supplied to the terminals based upon said connecting condition, and controlling said terminals so as to be able to decipher the specific data, when said terminals lie in a connecting condition and said terminals make a request for an access to specific data by meeting a specified condition.

* * * * *